US00RE36585E

United States Patent [19]

Pürstinger

[11] E Patent Number: Re. 36,585

[45] Reissued Date of Patent: Feb. 29, 2000

[54] PROCESS FOR COOLING AND CALIBRATING ELONGATED OBJECTS MADE OF PLASTIC TOGETHER WITH COOLING AND CALIBRATING DEVICE

[75] Inventor: Franz Pürstinger, Bad Hall, Austria

[73] Assignee: C.A. Greiner & Sohne Gesellschaft m.b.H., Kremsmunster, Austria

[21] Appl. No.: 09/074,237

[22] Filed: May 7, 1998

Related U.S. Patent Documents

Reissue of:

[64] Patent No.: 5,514,325
Issued: May 7, 1996
Appl. No.: 08/391,432
Filed: Feb. 21, 1995

[30] Foreign Application Priority Data

Feb. 22, 1994 [AT] Austria ..... 360/94

[51] Int. Cl.[7] ..... B29C 47/90

[52] U.S. Cl. ..... 264/560; 264/562; 264/568; 264/571; 264/209.4; 264/177.17; 264/177.19; 425/71; 425/325; 425/326.1; 425/379.1; 425/388

[58] Field of Search ..... 264/560, 557, 264/562, 209.3, 568, 571, 209.4, 177.17, 177.19; 425/325, 388, 71, 326.1, 379.1

[56] References Cited

U.S. PATENT DOCUMENTS

| | | | |
|---|---|---|---|
| 3,473,194 | 10/1969 | Farrow | 264/560 |
| 3,851,028 | 11/1974 | Beyer | 264/568 |
| 4,029,452 | 6/1977 | Schippers et al. | 425/71 |

(List continued on next page.)

FOREIGN PATENT DOCUMENTS

| | | |
|---|---|---|
| 0487778 | 11/1993 | European Pat. Off. . |
| 1504092 | 3/1969 | Germany . |
| 1936428 | 6/1970 | Germany . |
| 1923490 | 11/1970 | Germany . |
| 2239746 | 2/1974 | Germany . |
| 2456986 | 6/1976 | Germany . |
| 5302561 | 1/1978 | Japan . |

OTHER PUBLICATIONS

Ing. F. Sass and Ing. Ch. Bouche, Dubbels Taschenbuch für den Maschinenbau, Springer–Verlag, Berlin 1956, pp. 434–437.

(List continued on next page.)

*Primary Examiner*—Jan H. Silbaugh
*Assistant Examiner*—Mark Eashoo
*Attorney, Agent, or Firm*—Alston & Bird LLP

[57] ABSTRACT

The invention describes a process for cooling and if necessary calibrating elongated, especially continuously extruded objects (7) made of plastic as well as a cooling and calibrating device (5) for carrying out the process. With this the object (7) during its advancement in the longitudinal direction is exposed in consecutive regions (13 to 18; 86 to 89, 95 to 97) to a higher vacuum in each case and is cooled with respect to the initial temperature to a lower final temperature. The heat to be removed for cooling is extracted by a coolant washing round the object (7). The individual regions (13 to 18; 86 to 89, 95 to 97) in the transport direction of the object (7) are separated from each other from the covering plate (35) or the base plate (43) to the height of the object (7), whereupon by means of the vacuum a coolant on one longitudinal side of the section is drawn into a chamber of the region and is raised over the upper edge of the object (7) or a support diaphragm (81) extending transversely to the longitudinal direction from the base plate (43) to approximately the height of the object (7). The coolant overflows into a flush chamber (46; 102,107) located on the opposite longitudinal side of this region (13 to 18; 86 to 89, 95 to 97) or of the object (7) or of the support diaphragm (81) through an immediately following region (13 to 18; 86 to 89, 95 to 97) in the extrusion direction and is thereafter drawn into the tank (22) or into this following region (13 to 18; 86 to 89, 95 to 97).

46 Claims, 14 Drawing Sheets

U.S. PATENT DOCUMENTS

| | | | |
|---|---|---|---|
| 4,120,926 | 10/1978 | Titz | 264/568 |
| 4,181,487 | 1/1980 | Kessler | 425/326.1 |
| 4,401,424 | 8/1983 | De Zen | 425/388 |
| 4,411,613 | 10/1983 | Gauchel et al. | 264/568 |
| 5,008,051 | 4/1991 | DeCoursey et al. . | |
| 5,186,876 | 2/1993 | Purstinger et al. | 264/209.3 |
| 5,316,459 | 5/1994 | Melkonian et al. | 425/71 |
| 5,340,295 | 8/1994 | Preiato et al. | 425/71 |
| 5,499,507 | 3/1996 | Dorninger . | |
| 5,505,058 | 4/1996 | Dorninger . | |

OTHER PUBLICATIONS

Ing. F. Sass and Ing. Ch. Bouche, Dubbels Taschenbuch für den Maschinenbau, Springer–Verlag, Berlin 1956, pp. 434–437.

Ing. Wolfgang Beitz and Ing. Karl–Heinz Küttner, Dubbel Taschenbuch für den Maschinenbau, Springer–Verlag, Berlin 1983, pp. 159–163 and 243–246.

Walter Michaeli, Extrusions–Werkzeuge für Kunststoffe und Kautschuk, Munchen, Wien:Hanser, 1991, pp. 323–327, 345–346.

Dr. Franz Prášil, Technische Hydrodynamik, Verlag von Julius Springer, Berlin 1926, pp. 15 and 16.

32
27
15
36
14
7
31
4
67
27
62
67
34
13
63
68
54
62
69
64
45
55
132
33
8
20
71
70
62
63
5
46
43
57
44
50

Fig.11
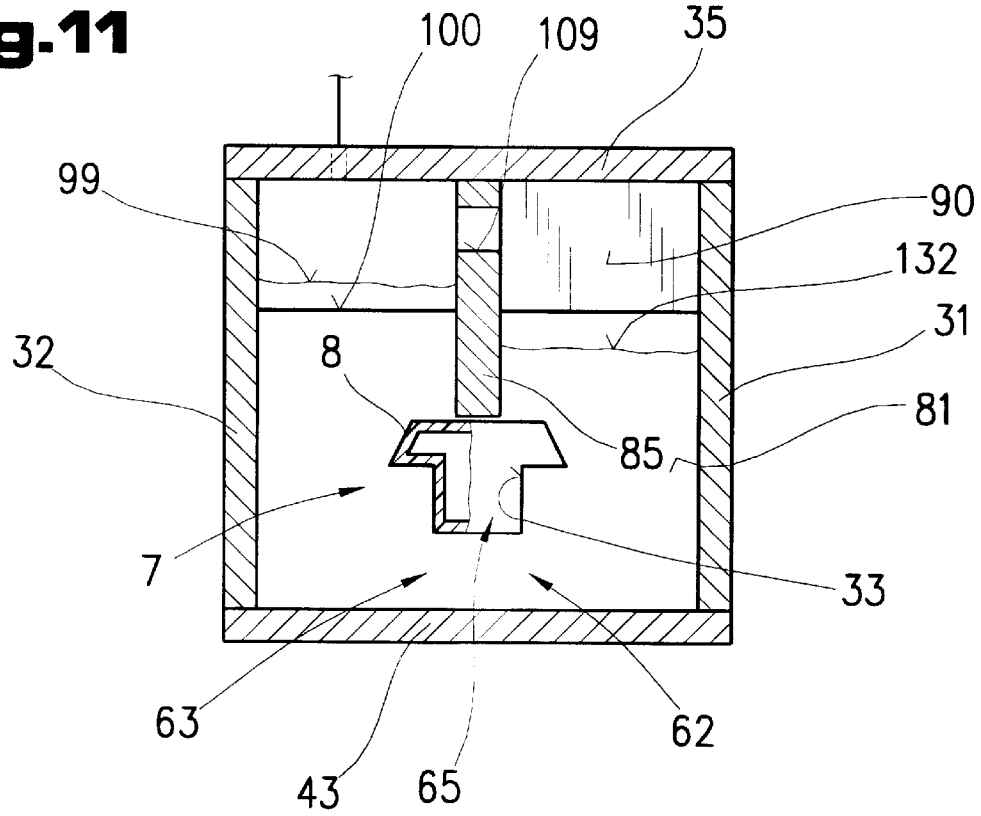
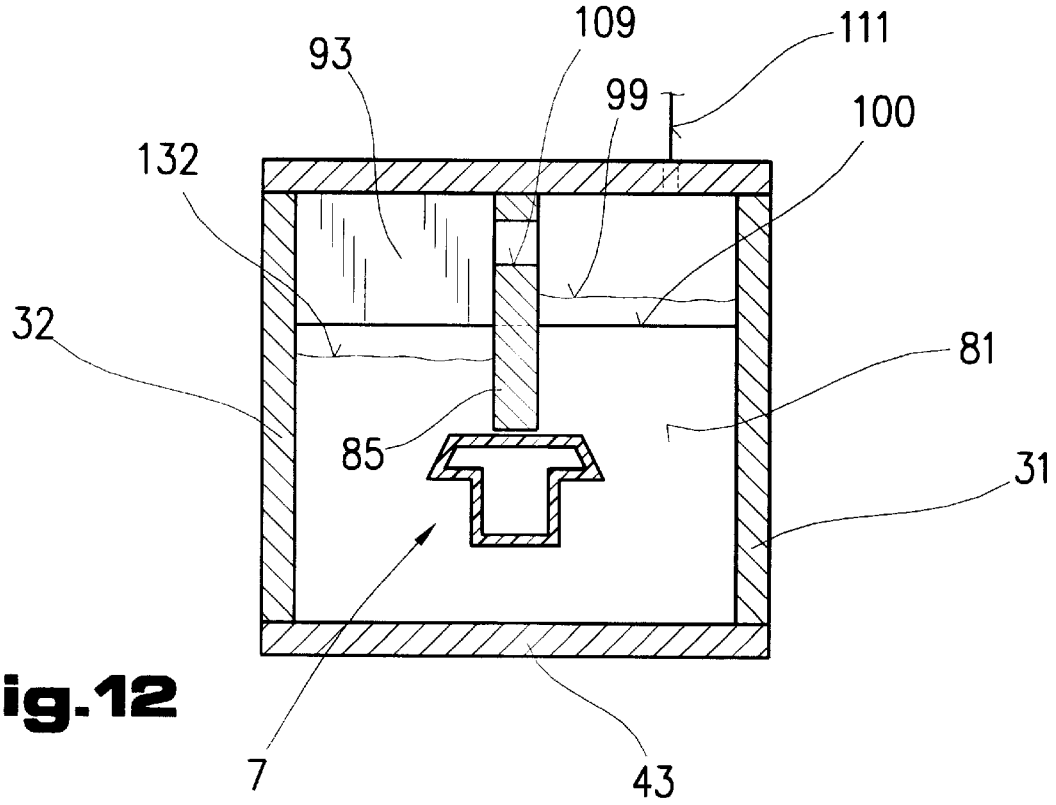
Fig.12

Fig.21
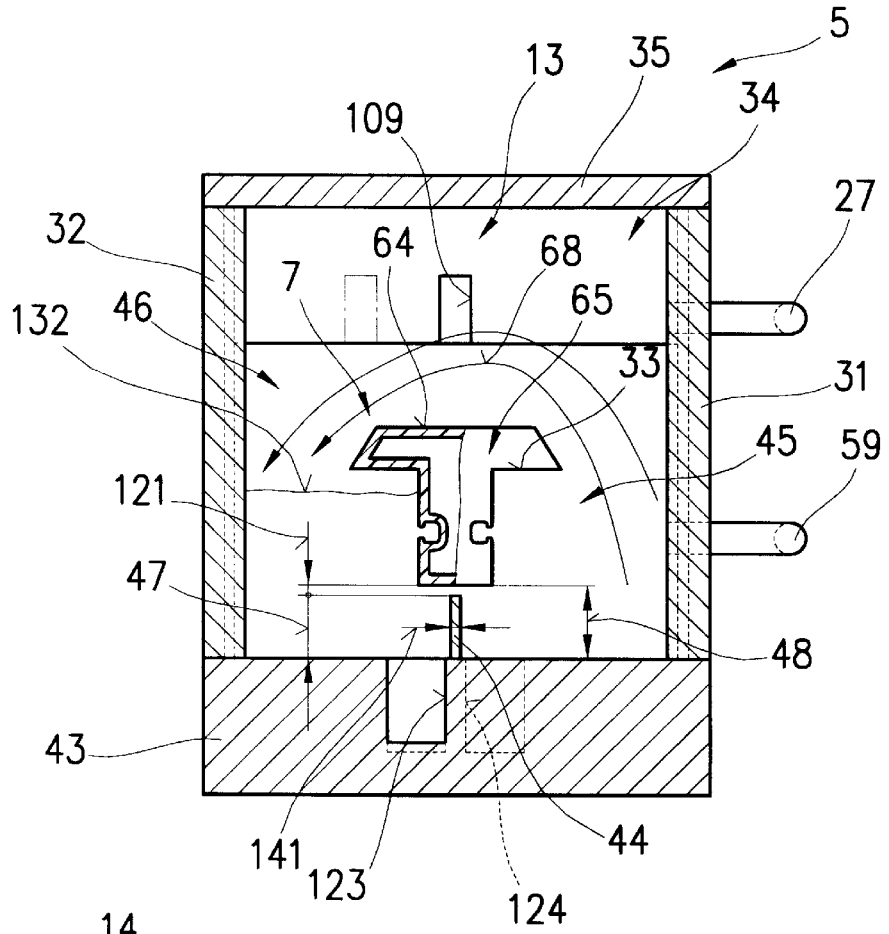
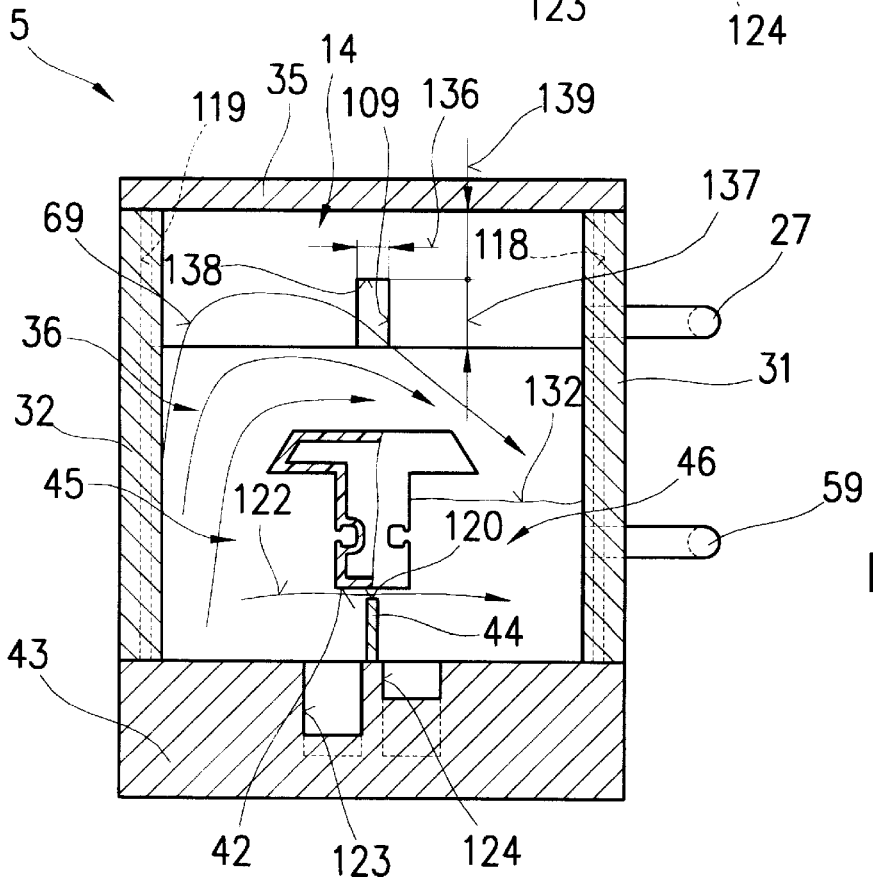
Fig.22

PROCESS FOR COOLING AND CALIBRATING ELONGATED OBJECTS MADE OF PLASTIC TOGETHER WITH COOLING AND CALIBRATING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention concerns a process apparatus for cooling an elongated extruded plastic object while advancing the object in a longitudinal direction through an interior of a closed housing.

2. Description of the Prior Art

Processes for cooling and calibrating elongated, especially continuously extruded plastic objects are already known according to U.S. Pat. No. 5,008,051 or EP-D1-0 487 778 in which the extruded objects or sections are cooled by passage through a continuous cooling chamber. In such a continuous cooling chamber, the extruded section is sprayed on all sides with coolant, especially cooling fluid such as water, usually by means of spraying nozzles, so that by the end of the passage it exhibits an adequate rigidity and in the interior of the continuous cooling chamber a uniform partial vacuum is built up so that on growing cold any collapse of the section walls is prevented. Because of the surface tension of the water, the water or other cooling fluid adheres during spraying to the surface of the section to be cooled so that the subsequently sprayed water or cooling fluid runs off over the existing film of cooling water and thus not all of the sprayed quantity of coolant comes into contact with the surface of the section to be cooled and, therefore, very large quantities of water per unit of time have to be sprayed on to the section in order to achieve a minimal cooling of the section during passage through the continuous cooling chamber.

The underlying task of the present invention is to create a process for cooling and a cooling and calibrating device for extruded objects in which the energy consumption for the cooling of the object can be kept small.

This task of the invention is solved by a process which comprises the steps of dividing the housing interior by support diaphragms into a plurality of consecutive regions including an inlet region at one end of the housing and an outlet region at an opposite end of the housing, passing the object into the inlet region and through calibrating apertures in the support diaphragms into the consecutive regions, and discharging the object from the outlet region, dividing the consecutive regions by a web extending in the longitudinal direction into chambers arranged at respective lateral sides of the object, the web extending a minimal distance from an end face of the object, circulating a cooling liquid though the consecutive regions by delivering the liquid to the inlet region through an inlet port in the housing and removing the liquid from the outlet region through an outlet port in the housing, each chamber at one side of the object being in communication with the chamber at the other side of the object in the consecutive region whereby the circulating cooling liquid flows from the chambers on the one side over the object into the chambers at the other side, and exposing the advancing object to a gradually increasing vacuum in the consecutive regions. In so doing it is advantageous that the vacuum needed to maintain the required quality of the object can be used simultaneously for the transport or for the improved wetting and for the intensified rinsing around the surface of the object. As a result the energy consumption for cooling the objects can be considerably reduced as on account of the better rinsing around the object a higher proportion of the quantity of water delivered comes into direct contact with the surface of the object to be cooled and thus the quantity of heat to be extracted can be extracted with a lower total amount of water per unit of time or with respect to the running meter of a manufactured object.

Furthermore at the same time it is achieved in a surprising manner that the additional consumption of energy to overcome the resistances in the spraying nozzle arrangements, as used in the hitherto known processes and device, is avoided. Linked with this is also the advantage that less primary coolant, especially fresh water, is required as the quantity of coolant turned over and hence the amount lost arising from its turnover is less.

By separating the consecutive regions in a fluid-tight and gas-tight manner, it is possible to use several cooling and/or calibrating devices arranged independently of each other one behind the other or alternatively to use the section contour, which is required anyway for guiding and for stabilising the cross-sectional shape of the objects, simultaneously for subdividing the cooling chamber or the continuous cooling chamber.

The higher vacuum which can act on the object or window section during progressive cooling ensures the dimensional stability and the surface planarity can be used simultaneously for the continuous transport of the coolant over longer longitudinal regions of the object.

Applying gradually increasing vacuum independently to each one of the consecutive regions makes it possible to adjust very delicately and to determine independently in the individual regions the height of the coolant level or of the water level together with the quantity of the overflowing coolant passing around the object.

A simpler process operation is achieved if vacuum pressure is applied to the inlet region and the vacuum is permitted to be gradually increased in the consecutive regions by providing flow openings between the regions, as a result of which the pressure conditions during cooling can be easily kept constant also while the process is being carried out.

A backwash of the coolant can further be prevented if the cooling liquid is drawn from the chamber at one side of the object into the chamber at the other side of the object in the consecutive region by the higher vacuum in the consecutive region and is raised above the object as it flows one side to the other side.

A favourable throughflow and agitation of the coolant and a simple control of the quantity of coolant to be passed through the region in unit time is achieved by jointly exhausting the vacuum and removing the cooling liquid from the outlet region.

The task of the invention is, however, also solved independently of the solution according to the process, by the cooling and calibrating apparatus for cooling an elongated extruded plastic object while advancing the object in a longitudinal direction, which comprises a closed housing comprising a cover plate, a bottom plate, two end walls and two side walls, the cover plate, bottom plate and walls defining an interior wherethrough the object is advanced in the longitudinal direction from an inlet region at one end wall of the housing to an outlet region at an opposite end wall, consecutive support diaphragms dividing the interior into consecutive regions, the support diaphragms having calibrating apertures through which the object passes and is advanced, a web extending in the longitudinal direction and dividing the consecutive regions into chambers arranged at respective lateral sides of the object, the web extending a minimal distance from an end face of the object, an inlet port in the housing for delivering a circulating cooling liquid to the inlet region and an outlet port in the housing for removing the liquid from the outlet region, each chamber at one side of the object being in communication with the chamber at the other side of the object in the consecutive region whereby the circulating cooling liquid flows from the chambers on the one side over the object into the chambers at the other side, and means for applying a gradually increasing vacuum to the consecutive regions. The means for applying a gradually increasing vacuum comprises an exhaust port in the outlet region of the housing, a vacuum pump having an intake connected to the exhaust port, and an intake port in the inlet region of the housing, the intake port being connected to an output of the vacuum pump. It is advantageous with such a solution that only by arranging an additional longitudinal web for subdividing the continuous cooling chamber into different longitudinal regions can the vacuum arranged in the cooling chamber or its housing be used for the transport of the coolant through this housing.

A further independent construction of the cooling and calibrating device with which the task of the invention can likewise be solved an embodiment wherein the web extends from the cover plate towards the end face of the object. Partitions are mounted on the consecutive support diaphragms, the partitions being alternately arranged between the cover plate, the web and one of the side walls and the other one of the side walls whereby the chambers in the consecutive regions at each side are closed off from each other. The advantage of this solution lies in that the longitudinal regions of an object or of a section lying opposite each other are ever more strongly cooled in successive regions and somewhat less strongly in a region immediately connected to that so that the strains building up during the more rapid cooling can be balanced out again in the subsequent region in which a smaller reduction of the temperature of the object or a smaller removal of heat takes place.

In a further embodiment, the web extends from the bottom plate towards the end face of the object, and channels below the bottom plate connect the inlet and outlet ports for the cooling liquid. This is advantageous as by the dimensioning of the channels the rate of flow or the intermixing of the coolant can be reinforced so that parts of the coolant at a higher temperature can be cooled down again to a lower average temperature by the additional quantity of coolant as a result of which the cooling effect of the entire cooling and calibrating device can be additionally increased.

If the inlet and outlet ports are arranged in the support diaphragms, it is possible to make do with a lower volume for the coolant and less technical outlay for the manufacture of the cooling and calibrating device and it is also simple to achieve the adjustment of the different partial vacuums in the individual regions when the cooling and calibrating device is started up.

According to another embodiment, flow conditions or turbulence remain approximately constant but are also improved in the first and last region in the direction of extrusion with an apparatus further comprising a tank holding the cooling liquid, a pump having an intake connected to the tank and an output, a pipe connecting the pump output to the inlet port in the housing for delivering the cooling liquid to the inlet region, and a pipe connecting the outlet port in the housing to the tank for removing the liquid from the outlet region into the tank.

It is also advantageous, if the apparatus further comprises a vacuum pump, a cyclone following the vacuum pump and another pump for the cooling liquid arranged in the connecting pipe between the outlet port and the tank, that means in energy efficiency terms a more favourable exhaustion of the air, for producing the vacuum, and of the coolant required for cooling is achieved.

It is of advantage if the one end wall has an intake opening receiving ambient air so that generally throughout the cooling and calibrating device and throughout the respective region a simpler formation of the vacuum can occur.

If the support diaphragms have flow openings permitting the air to pass therethrough, the entire cooling and calibrating device can be evacuated in a simple manner with a single pump. Also, an exhaust pipe may lead to a single vacuum pump used to establish gradually increasing vacuum pressures in the consecutive regions.

If the means for applying the gradually increasing vacuum comprises a vacuum pump and a separate pipe connecting each region to the vacuum pump, a sensitive and independent regulation of the vacuum in the individual regions can be achieved with which the differences in the partial vacuum in the individual immediately adjacent regions can be determined more freely.

The gradually increasing vacuum causes the level of the cooling liquid in each chamber at one side of the object to be higher than in the chamber at the other side of the object in the consecutive region so that a height difference is produced between the water columns in the two chambers following immediately on each other which achieves a gushing overflow and hence a good and strongly changing wetting of the section and thus a considerable cooling effect.

It proves advantageous to increase the vacuum gradually by at least 0.002 bar, preferably 0.005 bar, as by that means a difference in level between the water levels located in the two chambers following immediately on each other in a region can be so determined that the upper side of the section and a part of the upper lateral edge is intensively cooled when the coolant overflows.

If the minimal distance of the web from the end face of the object is between 0.5 mm and 5 mm, even in those regions in which the longitudinal web is facing the object or the window section, a good flow of coolant and hence also a good cooling effect adapted to the other regions is achieved.

If the support diaphragms are spaced from each other in the longitudinal direction from the inlet to the outlet region at increasing distances, in accord with the continuous hardening of the object during passage through the cooling and calibrating device on account of the cooling, those segments over which an intensive cooling occurs become larger and larger and furthermore with a lower number of regions a higher cooling effect can be achieved.

The side walls of the housing may have recesses displaceably receiving and holding the support diaphragms, and the recesses may have end faces defining a distance extending perpendicularly to the longitudinal direction and exceeding the width of the support diaphragms. In this way, the section contour contained in the support diaphragms can simply adapt to tolerance fluctuations or oscillations in the object or window section passing through as a result of which impairments in the surface of the object are adequately avoided.

If the support diaphragms have ports close to the calibrating apertures, continuous laminar flows can be set up over the entire length of the cooling and calibrating device which make possible an intensive cooling of the surface regions over the different longitudinal regions of the object.

The bottom plate may define flow channels recessed into the bottom plate and facing the interior of the housing, the flow channels being in communication with the chambers in the consecutive regions, and the flow channels may extend parallel to the longitudinal direction. Also, the flow channels may span the consecutive regions and extend from one of the regions to at least the center of the consecutive region in the longitudinal direction. The flow channels may have a rectangular cross section in plan view as well as in a plan extending perpendicularly to the longitudinal direction. The flow channels may also have a concave cross section in a plan extending perpendicularly to the longitudinal direction, and they may be offset from each other in a direction extending perpendicularly to the longitudinal direction. The flow channels may overlap consecutive ones of the regions. Furthermore, the apparatus may comprise a plurality of the flow channels between consecutive ones of the regions, and respective ones of the flow channels may be alternately arranged in the longitudinal direction between the web and a respective one of the side walls. These features make a plurality of different advantages possible especially in that in the immediate vicinity of the object the coolant is shifted into a higher flow rate and thus the relative velocity between the more rapidly flowing coolant and the object likewise advancing in the extrusion direction can be produced more simply which in turn initiates a higher wetting frequency of the surface of the object by the coolant and thus leads over all to an essentially more efficient cooling of the object with a considerably lower consumption of coolant.

Finally a good and intensified cooling action of the extruded object is also achieved by the following features: the flow channels may have side walls facing side walls of the web facing the side walls of the housing, the side walls of the channels being flush with the side walls of the web or spaced from the side walls of the web by less than 10 mm. The support diaphragms may have rectangular openings having a length extending perpendicularly to the bottom plate which exceeds a width thereof extending parallel to the bottom plate and transversely to the longitudinal direction. Furthermore, the support diaphragms may have openings arranged between the calibrating apertures and the cover plate, the openings having lower edges spaced from upper edges of the calibrating apertures. Also, the support diaphragms may have openings offset from the calibrating apertures in a direction extending perpendicularly to the longitudinal direction. The web may have a thickness of less than 10 mm, preferably less than 5 mm, extending perpendicularly to the longitudinal direction.

BRIEF DESCRIPTION OF THE DRAWINGS

In the following the invention is explained in more detail on the basis of the different embodiments illustrated in the drawings. They show:

FIG. 11—the cooling and calibrating device according to FIGS. 8 to 10 in front elevation taken along the lines XI—XI in FIG. 9;

FIG. 12—the cooling and calibrating device according to FIGS. 8 to 11 in front elevation taken along the lines XII—XII in FIG. 9;

FIG. 21—the cooling and calibrating device according to FIGS. 19 and 20 in front elevation taken according to the lines XXI—XXI in FIG. 19;

FIG. 22—the cooling and calibrating device according to FIGS. 19 to 21 in front elevation taken according to the lines XXII—XXII in FIG. 10.

DETAILED DESCRIPTION OF PREFERRED EMBODIMENTS

Figure 1:
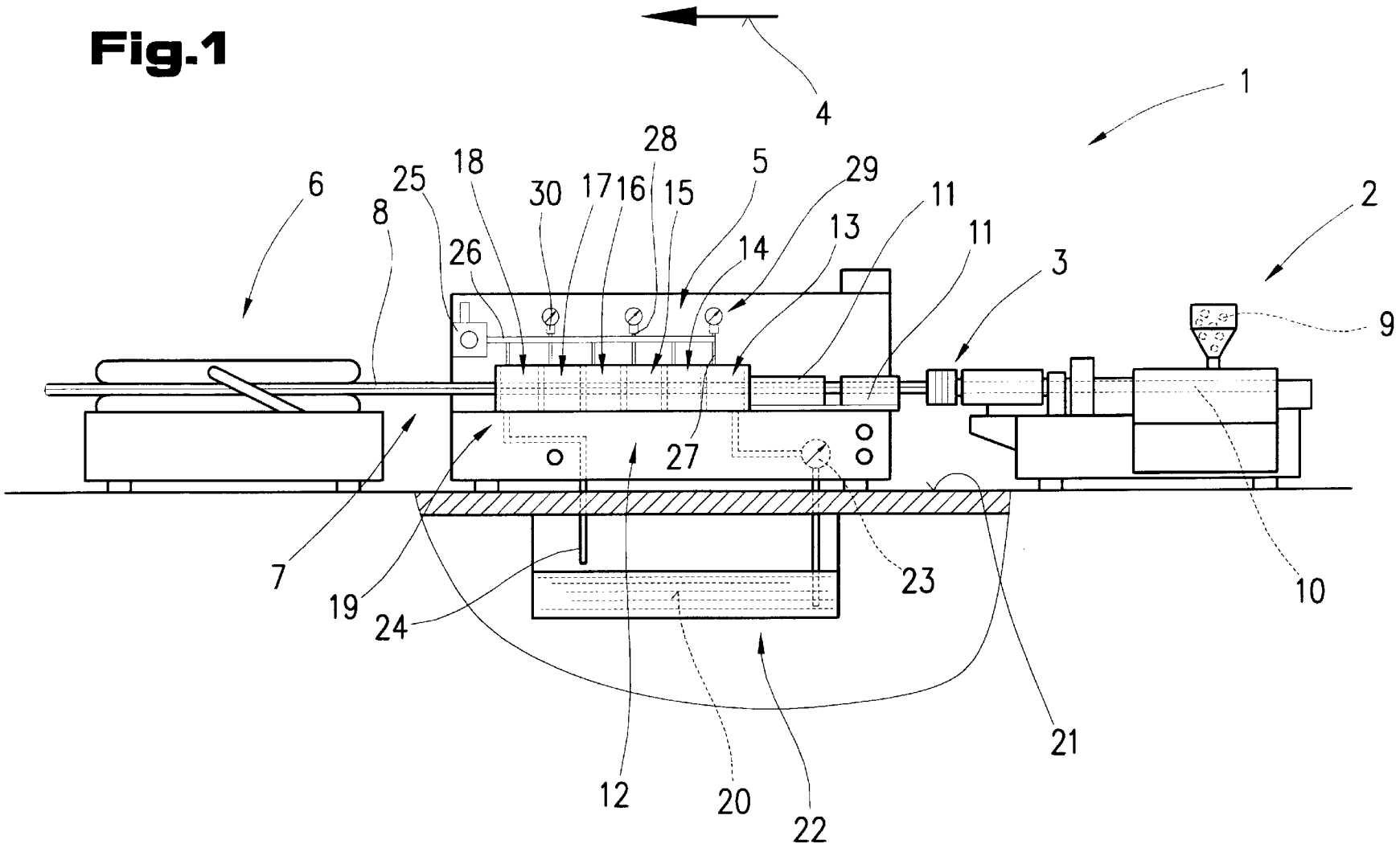
FIG. 1—an extrusion plant with a cooling and calibrating device according to the invention in side elevation and simplified schematic representation.

In FIG. 1 an extrusion plant 1 is shown which comprises an extruder 2, an extrusion die 3 and connected behind the latter in the extrusion direction—arrow 4, a cooling and calibrating device 5. Arranged behind this cooling and calibrating device 5 as a further part of the extrusion plant 1 illustrated in a schematic and simplified manner is a caterpillar take-off 6 with which an object 7, for example a window section 8, can be manufactured. For this purpose the plastic 9 added in granulate form is plasticised in the extruder 2 and carried out via a worm conveyor 10 in the direction of an extrusion die 3. To support the take-off movement and the moulding process of the object 7 the latter is drawn off with the caterpillar take-off 6 after it has been cooled down sufficiently by the cooling and calibrating device 5 that it is adequately hardened for transmitting an advancing movement.

The cooling and calibrating device 5 comprises two intake callipers 11 arranged one behind the other and a cooling chamber 12 arranged behind the latter. The intake callipers 11 are constructed in the present embodiment as dry callipers and give the object 7 the exact desired external shape.

The cooling chamber 12 is sub-divided into several regions 13,14,15,16,17,18 arranged one behind the other in the extrusion direction—arrow 4. The cooling chamber 12 is formed by an air- and fluid-tight housing 19 through which flows a cooling liquid, in particular water 20. For this purpose there is a tank 22 arranged for example beneath a setting up surface 21 of the extrusion plant 1, from which the cooling liquid, eg the water 20, is drawn out by means of a coolant pump 23 and can be forced through the housing 19 so that the returning cooling liquid 20 flows back into the tank 22 via a return tube 24. In the pipe to the return tube 24 or in the suction pipe to the coolant pump 23 an appropriate water cooler can be arranged with heat exchangers constructed according to the state of the art. It is of course also possible, however, to deliver fresh water repeatedly to the coolant pump 23 and to eliminate the used and warmed cooling water via the return tube 24 into a watercourse. As the necessary devices and arrangements for this purpose are adequately known from the prior art they will not be described further in more detail in the following in connection with the present invention.

In order to avoid that during the manufacturing process of the object 7, that is during cooling, a wall or several walls or part surfaces of the object 7, in particular the window section 8, cave in or sag, the object 7 is exposed to a vacuum during passage through the cooling and calibrating device 5 in the housing 19. This vacuum is produced for example with a vacuum pump 25 which is connected via an exhaust pipe 26 and connecting pieces 27 with the individual regions 13 to 18. Each of the connecting pieces 27 can be connected with a tee or a connecting tube on which a manometer 29 can be mounted when needed or permanently for monitoring and for adjusting the vacuum in each of the individual regions 13 to 18. For adjusting, corresponding throttle valves 30 can also be provided. Instead of the latter, however, it is also possible, by determining the dimensions of through bores and connection channels between the individual regions 13 to 18, with one central exhaust connection for the vacuum pump 25, to determine the continuing increase in the vacuum in the individual regions 13 to 18 and thus also in the extrusion direction according to arrow 4.

Solely for the sake of good order let it be noted in this connection that the coolant pump 23 as well as the vacuum pump 25 and the associated pipe parts are illustrated only schematically and in disproportionate size in order to be better able to explain the arrangement and mode of operation of the cooling and calibrating device 5.

In FIGS. 2 to 5, one embodiment of cooling and calibrating device 5 is shown.

Figure 2:
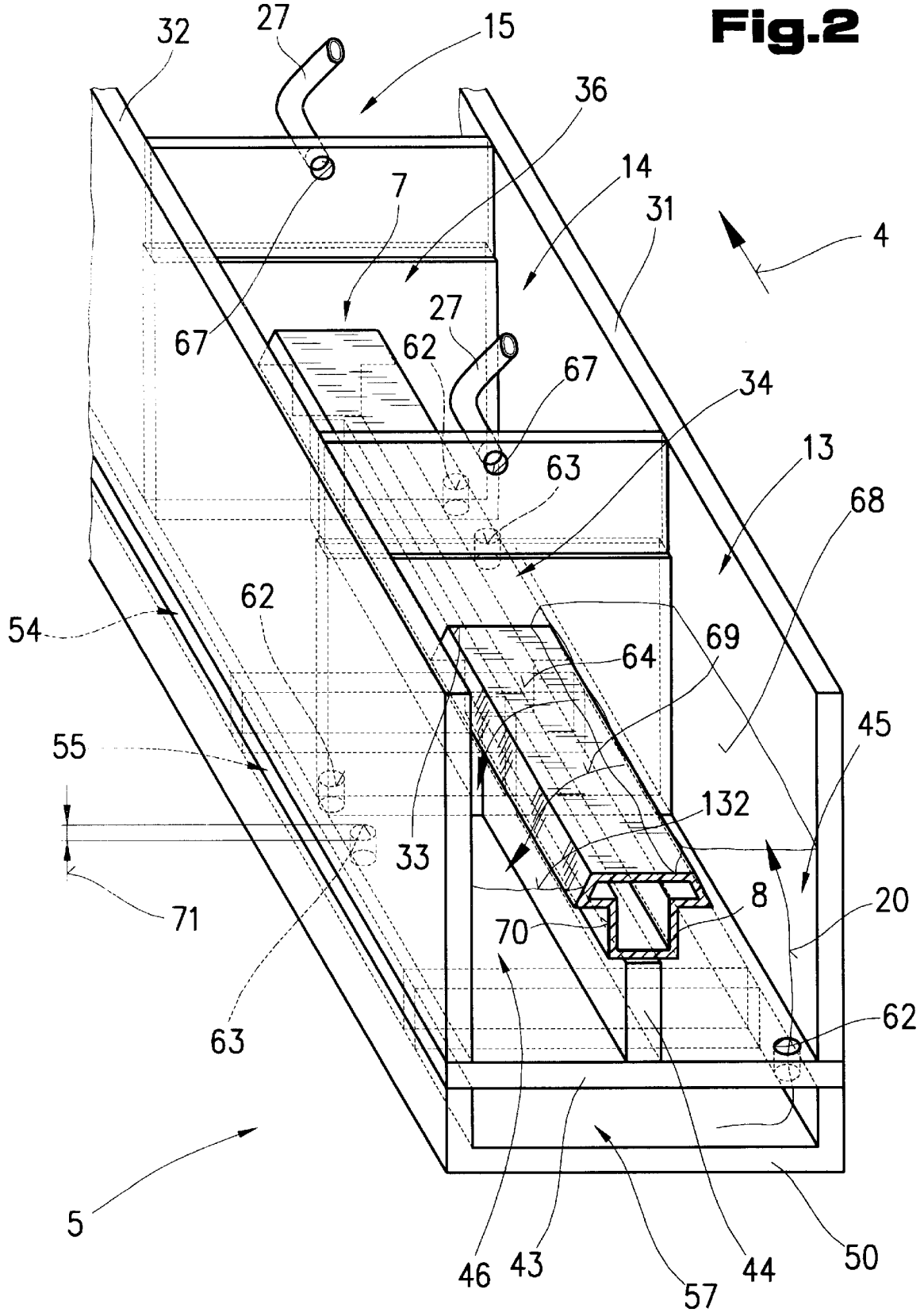
FIG. 2—schematic fragmentary view of a cooling and calibrating device in simplified perspective representation.

The function and the construction of the cooling and calibrating device 5 is best gathered from the perspective view in FIG. 2 drawn in the style of a phantom drawing in which side walls 31, 32 and a support diaphragm 34 receiving a section contour 33 are illustrated in a simplified manner and covering plate 35 (FIG. 3) is removed. The consecutive regions 13 to 18 are defined by the support diaphragms 34, 36, 37, 38, 39, receiving the section contour 33 and arranged one behind the other in the extrusion direction—arrow 4, in combination with the end walls 40, 41.

Each of these regions 13 to 18 is sub-divided by a longitudinal web 44 arranged between an underside 42 of the window section 8 and a base plate 43 into a chamber 45 and a flush chamber 46 at respective sides of the object 7, i.e. window section 8. An elevation 47 of this longitudinal web 44 is slightly smaller than a distance 48 between the underside 42 of the window section 8 and the base plate 43 of the housing 19. The resulting gap has a thickness of between 0.5 and 5 mm, preferably 2 mm, as a result of which a certain flow connection is formed between the chamber 45 and the flush chamber 46. This suffices to cool the object 7 appropriately, also on the surface facing the longitudinal web 44 by the coolant passing through at right angles to the longitudinal web 44 and flowing in the longitudinal direction of the latter.

Figure 3:
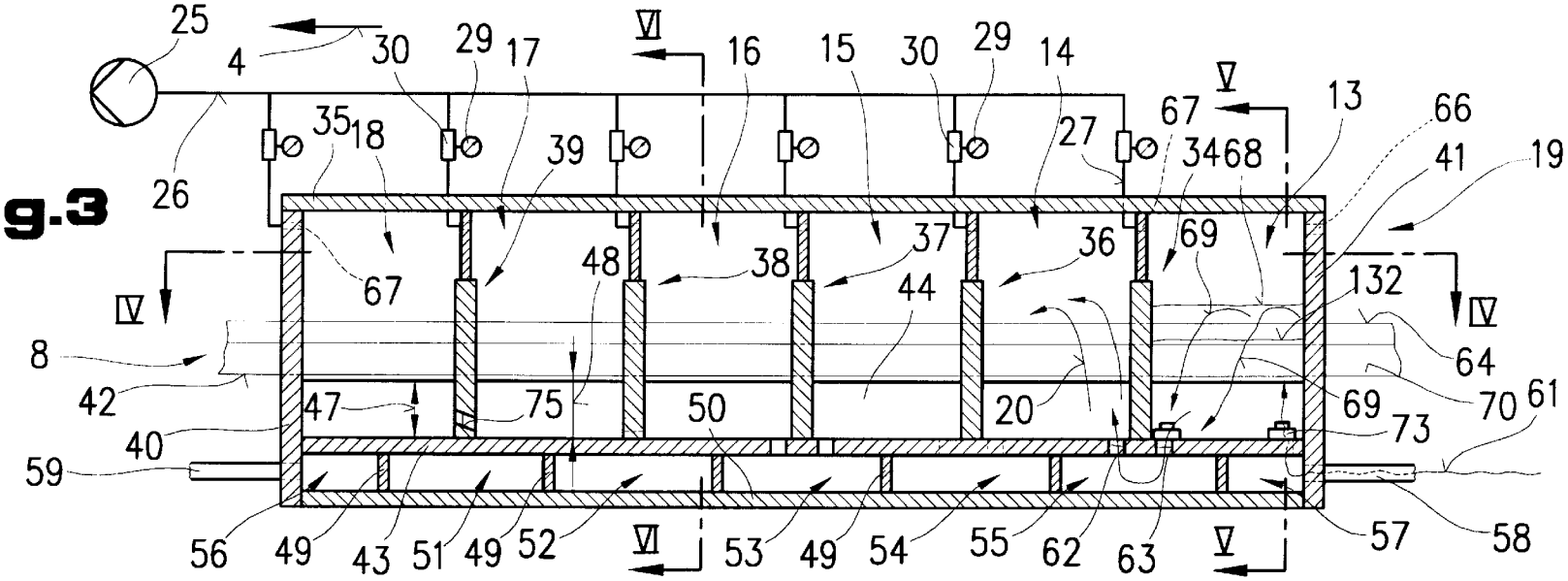
FIG. 3—the cooling and calibrating device in side elevation, taken along the lines III—III in FIG. 4.
Figure 4:
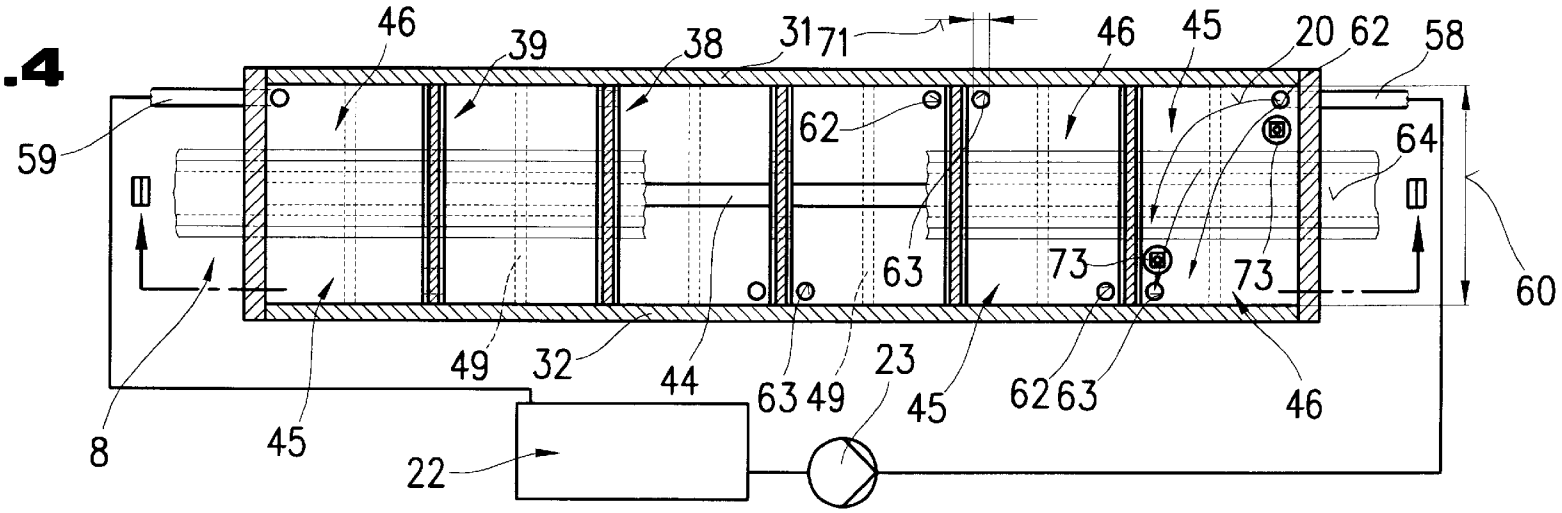
FIG. 4—the cooling and calibrating device according to FIGS. 1 to 3 in plan view, taken along the lines IV—IV in FIG. 3.

By means of transverse webs 49 an outer wall 50 of the housing 19 is arranged at a distance below the base plate 43. Channels 51, 52, 53, 54, 55 are defined by transverse webs 49, and connecting channels 56 and 57 are defined between end walls 40, 41, and adjacent webs 49. The connecting channel 57 is connected via a connecting pipe 58 and via the coolant pump 23 with the tank 22 while the connecting channel 56 is likewise connected to the tank 22 via a discharge pipe 59. As can be seen in FIG. 3, the transverse webs 49 are displaced in the longitudinal direction of the housing 19, that is in the extrusion direction—arrow 4, with respect to the support diaphragms 34 and 36 to 39 and the transverse webs 49 are located in each case between two support diaphragms immediately adjacent to each other in the longitudinal direction—arrow 4. While these transverse webs 49 and the channels can extend over an entire width 60 of the housing 19, it is equally possible that they extend in each case only between a respective side wall 31, 32 of the housing 19 and the longitudinal web 44 which, in this case, extends to the outer wall 50. In order now to enable a continuous passage of the coolant water 20 through the housing 19 in the longitudinal direction—arrow 4—as indicated at 61, the connecting channel 57 is connected via an inlet port 62 with the chamber 45 of the region 13 (FIG. 4). Adjacent the following support diaphragm 34, in the direction of transport, in the flush chamber 46 located opposite the object 7 an outlet port 63 is arranged which opens out into the channel 55, passes through this channel below the support diaphragm 34 and via a further inlet port 62 now enters into the chamber 45 of the region 14. As is best seen from the plan view in FIG. 4 the inlet and outlet port 62, 63 are arranged at a distance from each other in the direction of travel in corner regions located diagonally opposite each other. In order to enable a continuous passage of water 20 from the coolant pump 23 to the tank 22, the coolant water 20 must flow over an upper side 64 of the object 7 in order to go from the chamber 45 into the flush chamber 46 as passage of the fluid below the object 7, i.e. the window section 8 is largely prevented by the longitudinal web 44.

Figure 5:
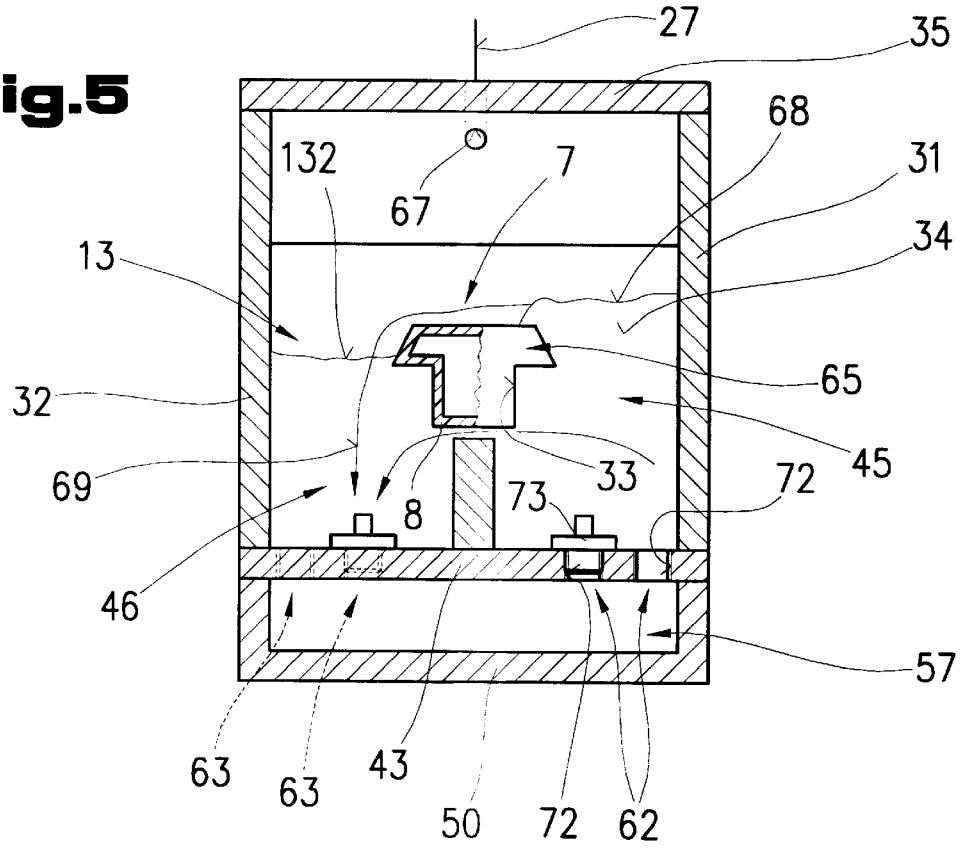
FIG. 5—the cooling and calibrating device according to FIGS. 1 to 4 in front elevation, taken along the lines V—V in FIG. 3.

Thus, the water 20 entering through the inlet port 62 flows over the upper side 64 of the window section from the chamber 45 into the flush chamber 46 and via the outlet port 63 to the channel 55 from where it enters through the inlet port 62 again into the chamber 45 of following region 14. In similar fashion, only in the opposite direction the coolant water 20 then flows around the window section 8 in region 14 and in the further regions 15 to 18 and flows via the upper side 64 into the flush chamber 46 to the outlet port 63 which at this stage is again located in the corner region between the side wall 31 and the next following support diaphragm 36 in the direction of extrusion—arrow 4. Each of these support diaphragms 34, 36 to 39 is provided, as is shown in FIG. 5, with an aperture 65 which corresponds to the cross sectional shape of the window section 8 or of the object 7, and normally has a section contour 33 whose outer dimensions are determined by taking into account the degree of shrinkage on cooling of the object 7 during passage through the cooling and calibrating device 5 in the extrusion direction—arrow 4. As a result of these regions 13 to 18 being partitioned from each other in an essentially air-tight manner by the support diaphragms 34, 36 to 39, an essentially air-tight closure is thus also achieved in the region of passage of the object 7 as any possible air gap between the surface of the object 7 and the aperture 65 or of the peripheral surface of the section contour 33 is sealed by a water film present on the surface of the object 7, which is washed with the coolant which forms the sealing closure.

Were the coolant water 20 merely pumped by the coolant pump 23 through the housing 19 of the cooling and calibrating device 5, the cooling effect would be relatively slight as the object 7, i.e. the window section 8 would only be drawn through by a quantity of liquid coolant which is essentially static or moving forwards at low speed.

In order to enable an intensive exchange of the coolant liquid, eg water 20, at the surface of the object 7, i.e. of the window section 8 in the individual regions 13 to 18, the coolant 20 is only pumped via the coolant pump 23 into the connecting channel 57 and from there into the regions 13 to 18 so that at the beginning of the extrusion process the coolant fills for example the interior space of the housing 19 up to the elevation 47. If the object 7, that is the window section 8 is then moved along and it extends, as can be seen from the illustrations in FIGS. 2 to 6, through the individual support diaphragms 34, 36 to 39 and the end walls 40, 41, a vacuum will be built up in the regions 13 to 18 via the connecting pieces 27. Meanwhile by using the manometer 29 and throttle valves 30 the vacuum in the individual regions 13 to 18 can be adjusted so that the vacuum increases slightly from region 13 up to region 18, that is in the extrusion direction according to arrow 4. For this purpose it is necessary to arrange an intake opening 66 in the end wall 41 adjacent the covering plate 35 in order to enable a corresponding air circulation and thus to ensure the build up of the vacuum. If, as shown in this embodiment, each region 13 to 18 is allocated its own connecting piece 27, the vacuum is formed in the individual regions 13 to 18 by exhausting air through suction openings 67 in each region whilst a separate intake opening 66 are arranged in each region 13 to 18.

The suction openings 67 for building up the vacuum in the regions 13 to 18 are arranged in the support diaphragms 34 and 36 to 39 in each case adjacent or close to the covering plate 35 and open out into the connecting pieces 27 which are connected to the exhaust pipe 26. By this means it should be prevented that coolant, especially water 20, is also drawn in via these suction openings 67 into the connecting pieces 27 and thus transported to the vacuum pump 25. With this arrangement it is necessary to allocate to each region 13 to 18 its own intake opening 66. If only one suction opening 67 is arranged in the end wall 40 (FIG. 3), the regions 13 to 18 have a flow connection among themselves by means of the intake openings 66 arranged in the support diaphragms 34, 36 to 39, as a result of which the build up of the vacuum can likewise be achieved.

The vacuum in the regions 13 to 18 has the effect, as is best seen with reference to the schematic drawing in FIG. 2, that the coolant, in particular the water 20, passed in by the inlet port 62 is lifted over the upper side 64 of the object 7, as represented by a wavy line, and a head of water with a coolant level 68 is formed. This build up of the head of water up to the coolant level 68 takes place in the chamber 45, that is in that chamber in which the inlet port 62 opens out, as an overflow of the water from the chamber 45 into the flush chamber 46 is prevented by the longitudinal web 44 and by the object 7. A gap remaining between the longitudinal web 44 and the object 7 in the direction of the elevation is filled by the liquid flowing through from one region into the other. The height of the water level above the upper side 64 of the object 7, i.e. of the window section 8 now adjusts itself according to the vacuum prevailing in each case in the regions 13 to 18.

As a result, a surprising effect is achieved. By raising the coolant water 20 in the chamber 45 of the following region 14, in the extrusion direction—arrow 4, a suction is exercised on the coolant in the flush chamber 46 of the region 13 which causes a rapid flow of coolant and an agitation of the latter through the flush chamber 46. The coolant water 20 thus flows from that part of the head of water in chamber 45 of the region 13 overhanging the object 7, as indicated schematically by arrow 69, over into the flush chamber 46. In overflowing from the chamber 45 into the flush chamber 46 of the region 13 the coolant water 20 washes round the upper side 64 and the side walls 70 of the object 7 in the manner of a waterfall or surge of water. As this overflow of coolant water 20 in the manner of a waterfall takes place under highly variable pressure conditions it results in a film-like cascade of the coolant and, therefore, in an intimate contact with and washing of the object 7, i.e. of the window section 8. As a result a better heat transfer from the window section 8 to the coolant water 20 is achieved and more thermal energy can be removed with the same quantity of coolant. Thus for example comparative tests have shown that with approximately equal temperatures of the coolant water 20 at the inlet port 62 and the outlet port 63 in hitherto known plants, a quantity of water of about 500 l/min must be applied to the window section via spray nozzles, whilst on using the device according to the invention or the process according to the invention only 20% of this quantity of water, ie 90 to 130 l/min are required in order to enable the same cooling effect or the removal of the same amount of heat.

The build up of the individual heads of water in the various chambers 45 of the regions 13 to 18, and the overflow of the coolant water 20 occurs as the partial vacuum rises from one region to the following region in the extrusion direction—arrow 4—by 0.005 bar.

As a result a pressure gradient is built up which causes the aspiration of coolant water 20, for example from the lower head of water in the flush chamber 46 of the region 13, as indicated schematically by the arrow 69, into the region 14 with higher vacuum. This aspiration or drawing off of the coolant water 20 which overflowed over the window section 8 in the region 14 occurs via the outlet port 63 and the inlet port 62. Analogously the further transport of the coolant from region 14 then also takes place to the further regions 15 to 18.

The preferred embodiment has proved to be to feed the coolant, in particular the water 20, via the connecting pipe 58 at a pressure of 1 bar and in region 13 to lower the pressure to 0.940 bar. In principle the same partial vacuum then prevails in region 13. The different height of the heads of coolant in region 13 in order to enable the overflow of the coolant water 20, according to the arrows 69 from the coolant level 68 in the chamber 45 in the direction of the flush chamber 46, arises in that in the adjoining region 14 the pressure is lowered to 0.935 bar, that is there is a higher vacuum than in region 13. Depending on a diameter 71 of the outlet port 63, in the region surrounding this outlet port 63, a suctional flow is now built up via the channel 55, as is clearly visible in FIG. 3, and the inlet port 62 to the region 14, which exhausts the coolant from the region 13 and, therefore, draws on the overflowing coolant water 20. According to whether the difference in the vacuum between the regions 13 to 18 is greater or smaller, the difference between the water levels in the chambers 45 and flush chambers 46 is also greater or smaller. Other fluids with high heat absorption capacity can also be used as coolants. If the diameter 71 of the outlet port 63 is larger, the suction built up in the region 13 of the base plate 43 of the flush chamber 46 and hence the quantity of coolant drawn off is greater than when the diameter 71 of the bore is smaller. Because of these dependencies it is also possible that via the diameter 71 of the bore for the outlet port 63 or the cross sectional dimensions of slots forming the outlet port 63 or similar measures the pressure gradient in region 13 between the inlet port 62 and the outlet port 63 and thence by analogy in all other consecutively following regions 14 to 18 can be so determined that an adequate throughput of coolant or alternatively a correspondingly strong turbulence of the coolant water 20 on flowing past the surface regions of the window section 8, i.e. object 7 is achieved.

Obviously the advancement of the coolant or alternatively the flow through the housing and the chambers 45 or flush chambers 46 is built up by the rise of the vacuum in the chamber itself on account of the different distances to the suction opening 67 so that in principle a suctional pull in the extrusion direction—arrow 4—is exercised on the coolant liquid, that is the water 20, which supports the forward movement of the coolant through the housing 19.

With the same diameters for the inlet and outlet port 62, 63 established at the outset the quantity of coolant water 20 flowing through the regions 13 to 18 can be altered by the pressure difference between the individual regions 13, 14 or 14, 15 so that for example the quantity of coolant flowing through can be simply matched to the quantity of heat to be removed on the basis of the cross sectional area and the quantity of material per running meter of the object 7 to be manufactured. As a result it is for example possible to use the cooling and calibrating device, simply by exchanging the individual support diaphragms 34, 36 to 39 as well as the end walls 40, 41, for the manufacture of objects 7 with different cross sectional shapes or cross sectional dimensions, wall thickness or the like, without loss of the advantages according to the invention.

For the universal adaptation of the cooling and calibrating device 5 it is of course also possible to provide several outlet or inlet ports 63, 62 in each region 13 to 18 or, as was already explained previously, to construct these as slots which can be opened or closed according to need when greater and smaller throughput quantities of coolant water 20 are desired.

For this purpose, as is indicated as an example in FIG. 5, several inlet ports 62 can be arranged in region 13 or also in the remaining regions 14 to 18, it being possible to make the same or similar arrangements also for the outlet ports 63, as likewise illustrated only in region 13. For this it is advantageous if the inlet or outlet ports 62, 63 are provided with an internal thread 72 so that they can be closed or opened as required by means of plugs 73 or other appropriate closure elements such as stoppers or the like. Thus the throughput quantity and also the rate of throughflow of the coolant water 20 can be matched in a simple manner to different running metric lengths of the object 7 to be cooled both with regard to different cross sectional thicknesses or cross sectional areas of the object 7 and also in adaptation to different extrusion speeds, that is speeds of passage of the object 7 in the extrusion direction—arrow 4.

As already explained above, any turbulence of the coolant water 20, in the region of the head of water rising in every region 13 to 18 in the chambers 45 to the coolant level 68, is changed by the rate of inflow or alternatively the type of inflow of the coolant into the following region in each case 14 to 18. A continuous intermixing of the coolant in this head of water or an internal circulation is especially very useful because as a result the quantities of coolant adjacent to the outer surface of the object 7, i.e. window section 8 are constantly exchanged and thus a better heat transfer can be achieved.

Figure 6:
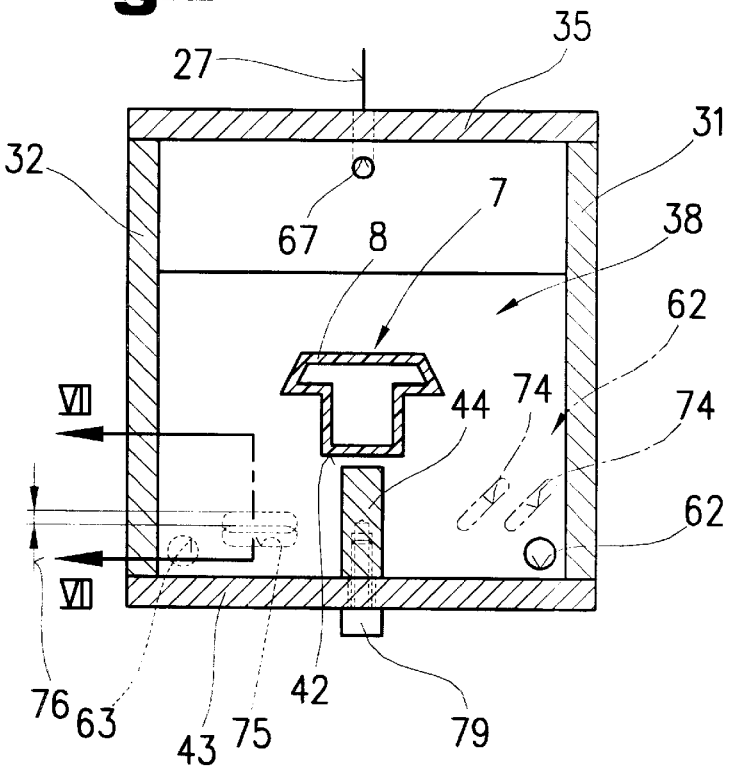
FIG. 6—another embodiment of the cooling and calibrating device according to FIGS. 1 to 5 in front elevation.
Figure 7:
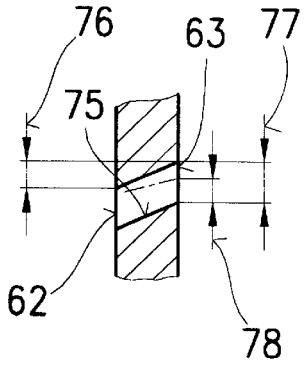
FIG. 7—another embodiment for the construction of the inlet and outlet port in a support diaphragm for connecting two immediately adjacent regions in side elevation taken along the lines VII—VII in FIG. 6.

In order to control or to accelerate this intermixing of the coolant in the head of water, instead of the arrangement of the outlet ports or inlet ports 63, 62 in the region of the base plate 43, it is possible to arrange these in the support diaphragms 34, 36 to 39, as is shown as an example in support diaphragms 38 and 39 in FIGS. 6 and 7. Thus it is possible, using the water 20 flowing under differential pressure from the preceding, in the extrusion direction—arrow 4, into the following region 13, 14 or 14, 15 or 15, 16, etc to agitate the head of water in the chamber 45. Here also of course it is again possible, as already explained with reference to FIG. 5, that several inlet and outlet ports 62, 63 can be arranged.

Thus, as indicated by dotted lines, the inlet ports 62 and by analogy of course also the outlet ports 63 can be constructed as slots 74. These can for example run at a slant to the base plate 43 and also inclined to the side walls 31, 32.

As, however, is shown as an example in the outlet port 63 in support diaphragm 39 and in the section in FIG. 7, a slot 75 can also penetrate the support diaphragm 39 rising or falling in the extrusion direction arrow 4. By means of a difference in height 76 between the inlet port 62 and the outlet port 63 a suitable guidance of the inflowing coolant water 20 can be achieved and hence a directed agitation of the coolant in the head of water in the chamber 45. In addition it is for example also possible that an exit height 77 is reduced relative to the transit height of the slot to a size 78 so that in this region a jet effect arises which supports the agitation of the coolant water 20 in the head of water.

As is further shown in FIG. 6, the fastening of the longitudinal web 44 can be done using fastening means 79, for example internal hexagon head screws, so that when using the cooling and calibrating device 5 for differently sized objects 7, for example window sections 8, tubes, door sections, covering strips and similar objects, a matching of the distance 48 between the base plate 43 and the underside 42 of the object 7 can take place simply.

As is further evident from the representation in FIG. 6, on arranging the inlet and outlet ports 62, 63 in the support diaphragms 34, 36 to 39, the channels 51 to 55 and the connecting channels 56 to 57 can be dispensed with.

The mounting or fastening of the individual support diaphragms 34, 36 to 39 and of the end walls 40, 41 in the housing 19 can take place in any form known from the prior art, such as by sticking, sealing, retaining strips, retaining studs, slots, sealing sections, grooves etc.

In FIGS. 8 to 12 another embodiment of a cooling and calibrating device 5 is shown.

As the basic structure of the cooling and calibrating device 5 in FIGS. 8 to 12 corresponds essentially to that according to FIGS. 1 to 7, the same reference symbols as in FIGS. 1 to 7 are used as far as possible for the same parts in the description of this embodiment.

Figure 8:
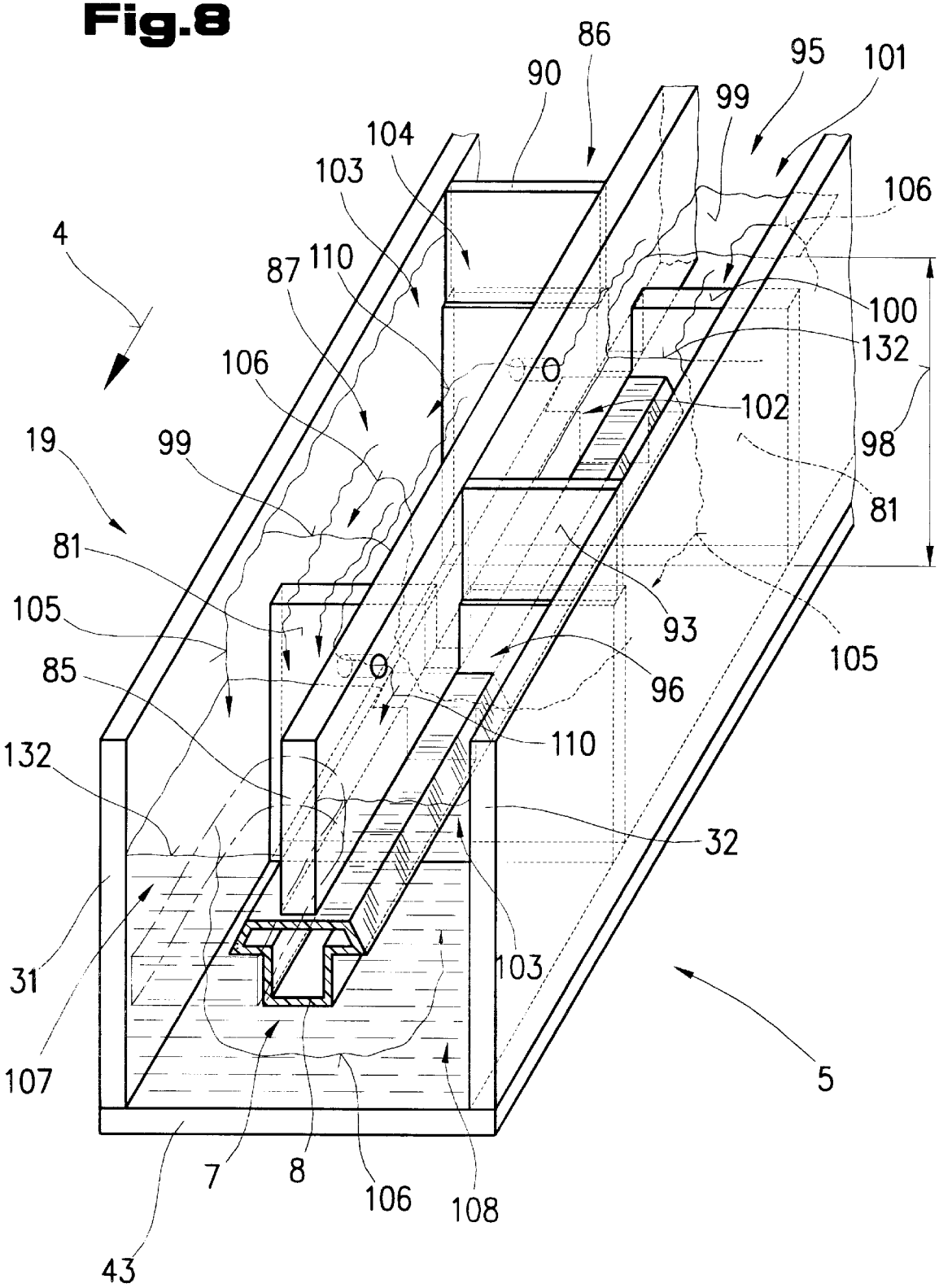
FIG. 8—another embodiment of a cooling and calibrating device in simplified perspective representation.

The housing 19 through which the object 7, i.e. the window section 8 is guided consists of a base plate 43.and side walls 31, 32 and the covering plate 35 which for the sake of clarity is lifted off and not shown in FIG. 8. The housing 19 is again closed by end walls 40, 41—FIGS. 9 and 10.

Both in the end walls 40, 41 as well as in the support diaphragms 81 arranged between them in the interior of the housing 19 at a distance 80 from the end walls 40, 41 and from each other, section contours 33 defined by apertures 65 adapted to the outer periphery of the object 7 are arranged, through which the object 7, i.e. the window section 8 is led and vertically and laterally supported. The outer dimensions of the object 7 and of the apertures can become smaller from the end wall 41, the support diaphragm 81 in the direction of the end wall 40, that is in the extrusion direction according to arrow 4, in order to take appropriate account of the shrinkage occurring on cooling. For extracting thermal energy from the object 7, i.e. from the window section 8 during the passage through the housing 19, at the beginning of the extrusion process the housing 19 is partially filled with coolant, in particular water 20. As was already described with reference to FIGS. 1 to 7, this is stored in a tank 22 and introduced into the interior of the housing 19 via a coolant pump 23 and a connecting pipe 58 and led back again to the tank 22 via a discharge pipe 59. For cooling the coolant or water 20 or another cooling liquid, such as for example oil similar liquids, intermediate coolers 82 can also be provided in order to cool the coolant water 20 down again to a desired starting temperature.

Furthermore, for evacuating an interior space 83 of the housing 19, a vacuum pump 25 is arranged whose suction pipe 84 can as an example be connected to several manometers 29 and throttle valves 30.

In contrast to the embodiment according to FIGS. 1 to 7, in the embodiment now described a longitudinal web 85 is provided which extends from the covering plate 35 into the region of an upper side 64 of the object 7, i.e. of the window section 8.

The elevation 47 of the longitudinal web 85 is slightly, as an example between 0.5 and 5 mm, smaller than a distance 48 between the inner side of the covering plate 35 facing the object 7 and the upper side 64 of the object 7.

As the object 7, i.e. the window section 8 runs at quite a large distance from the inner surface of base plate 43 facing it, the longitudinal sides are in communication with each other between the respective support diaphragms 81 in the region of the side walls 31, 32 located opposite each other, whereas they are separated from each other in the region above the object 7 by the longitudinal web 85.

Figure 10:
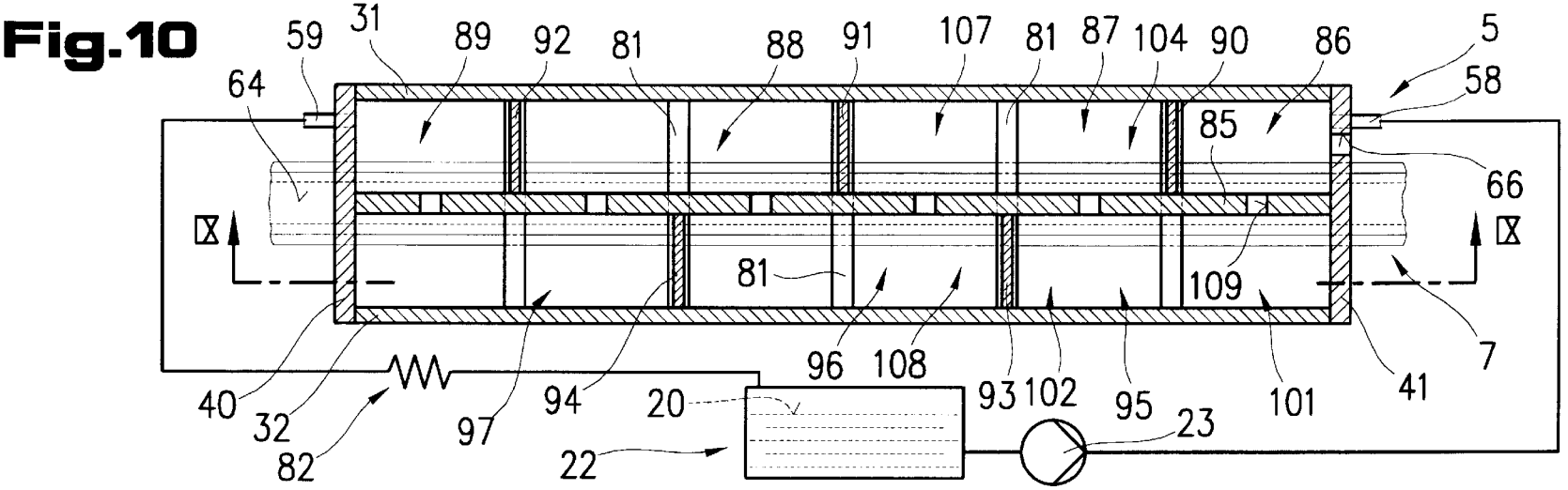
FIG. 10—a plan view of the cooling and calibrating device in section according to the lines X—X in FIG. 9.

In the case of the embodiment now described, the individual regions 86 to 89 separated from each other between the longitudinal web 85 and the right side wall 31, in the extrusion direction—arrow 4, are formed by partitions 90 to 92 which in each case between the side wall 31 and the longitudinal web 85 seal the open space between the support diaphragms 81 and the covering plate 35 in an air-tight manner. By arranging further partitions 93, 94 further regions 95 to 97 can be produced between the longitudinal web 85 and the left side wall 32, with reference to the extrusion direction—arrow 4, these regions 86 to 89 and 95 to 97 being displaced relative to each other in such a way that they overlap each other in the longitudinal direction. This is achieved in that between the partitions 90, 91 and 91, 92 in each case a support diaphragm 81 is arranged on which no partition is set up, and then opposed to this support diaphragm 81 on the opposite side of the longitudinal web 85 one of the partitions 93 or 94 is arranged, between which again a support diaphragm 81 is arranged on which no partition is set up (FIG. 10).

Because between the individual support diaphragms 81, between the end wall 41 and the nearest support diaphragm 81 and between the end wall 40 and the nearest support diaphragm 81, the space between the base plate 43 and an underside of the object 7 is not closed, this space serves as a flow channel which connects the inlet and outlet port 62, 63 to each other. As a result a direct connection between the region 86 and the region 95, that is between the partitions 90 and 93 arranged in the extrusion direction—arrow 4—immediately consecutive to each other is possible. By this, however, a connection of the region 95 with the region 87 between the partitions 93 and 91, of the region 87 with the region 96 between the partitions 91 and 94, of the region 96 with the region 88 and, between the partitions 94 and 92, of the region 88 with the region 97 and between the partition 92 and the end wall 40, the region 97 with the region 8,9 is also enabled.

As is shown schematically in the perspective representation in FIG. 8 in which again for better clarity the covering plate 35 has been removed and presented in the style of a phantom drawing, by means of the vacuum in region 95 which is slightly higher than the vacuum in region 86 the coolant water 20 is raised to a level 98, i.e. a head of liquid comprising coolant is built up whose coolant level 99 is located above an end edge 100 of the support diaphragm 81 which supports the partition 90 between the longitudinal web 85 and the side wall 31.

As a result of the vacuum being higher in region 87 than in region 95, as will be explained in further detail in the following, an effect occurs similar to that already explained for the previously described embodiment shown in FIGS. 2 to 5, in which the coolant flows down from a chamber 101 arranged in region 95 into a flush chamber 102 in the manner of a waterfall, as below the object 7 as a result of the cross connection between the region 87 and the region 95, a suctional pull acts on the coolant in the flush chamber on account of the higher vacuum in region 87. Therefore the water flowing down from the coolant head 103 from the chamber 101, after cascading round the object 7 and being sucked through below the object 7 is drawn into the chamber 104 to form a further coolant head 103 with the coolant level 99. This chamber 104 is bounded by the partition 90, the support diaphragm 81 facing it, as well as by the following, in the extrusion direction in the sense of arrow 4, support diaphragm 81, the side wall 31 and the longitudinal web 85. This transport route of the water 20 for cooling the object 7 is additionally made clear by means of the arrows 105 and 106. From the chamber 104 the water then flows or falls subject to the suction of coolant into the next region according to the arrow 105 into the flush chamber 107 in which there is a coolant head of lower height and is sucked on into the following chamber 108 of region 96 for the formation of the coolant head 103.

In order to illustrate graphically the different pressure conditions in the different regions 86 to 89, 95 to 97, in FIG. 8 the coolant water 20 was illustrated and that region in which a suction effect exists in region 87 on account of the higher vacuum in region 96 made optically visible by a dotted line. Thus the falling or flowing down of the coolant from the height of the coolant level 99 according to the arrows 105 into the region of the coolant level of the lower coolant head is supported, while on account of the constantly changing suction in the region of the partial region marked by dotted lines of region 87 on account of the suction action exercised over the coolant head 103 in the region of the base plate 43, the coolant flowing down from the coolant level 99 is strongly agitated and therefore a good cooling of the object 7 is attained.

The further transport of the coolant or water 20 through the regions 88, 97 and 89 then occurs analogously.

The formation of the different vacuum pressures, which can be higher by 0.002 to 0.1 bar per region in the extrusion direction—arrow 4, can now as an example occur in such a way that the individual regions are connected above the coolant level 99 by flow openings 109 so that, as is schematically indicated by the thin arrows 110, a vacuum is built up throughout the entire housing 19, in that through the suction pipe 84 the air is sucked off from the interior of the housing by the vacuum pump 25, while by means of the size of the flow openings 109, in particular their cross sectional area, the drop in pressure from region 89 to the region 97 and then to the region 88, 96, 87, 95 and 86 can be determined. In the end wall 41 the intake opening 66 is again arranged for the build up of the vacuum. By this means it is possible by a central suction and the corresponding layout of the flow openings 109 to control the drop in pressure, i.e. the gradation of the vacuum in the individual regions simply.

Figure 9:
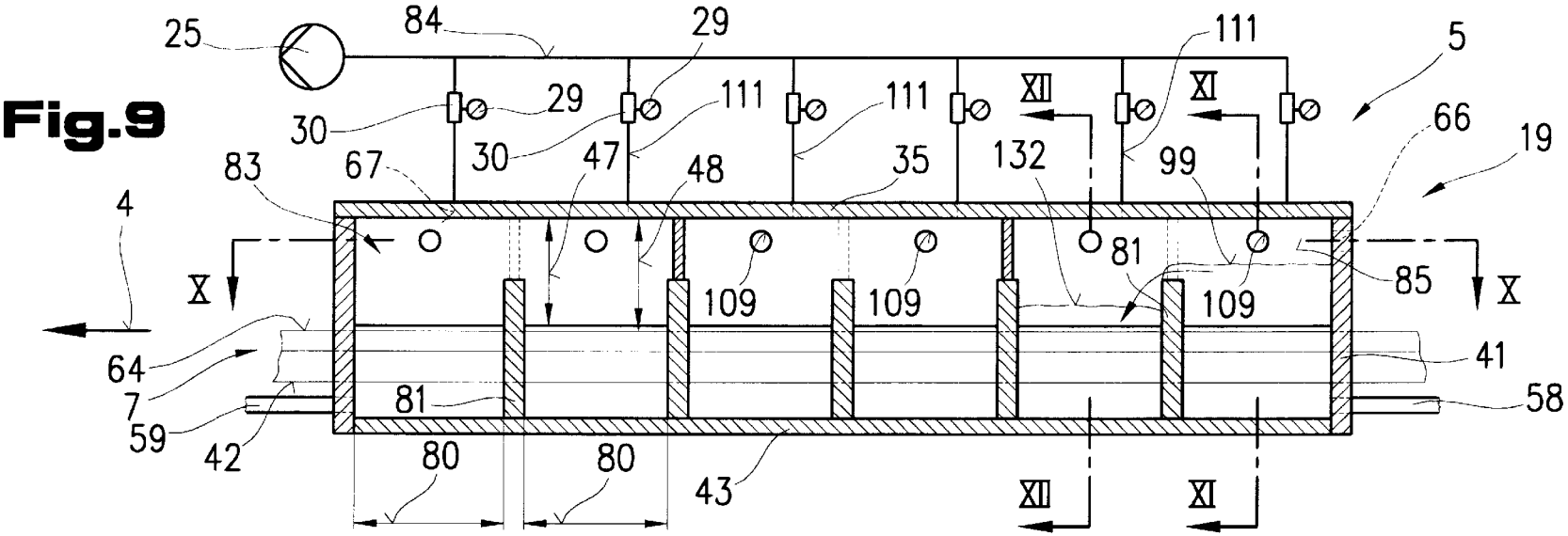
FIG. 9—another embodiment of the cooling and calibrating device in side elevation taken along the lines IX—IX in FIG. 10 and greatly simplified schematic representation.

Of course, however, it is also possible, as is also indicated schematically in FIG. 9, to allocate a connecting tube 111 to each individual region and to seal the flow openings 109 or not to provide them at all. In this case the vacuum can then be adjusted using a manometer 29 and a throttle valve 30 which can be arranged over the entire duration of operation or only during the start-up of the extrusion process, with each individual region being allocated its own intake opening 66.

The mounting or fastening of the individual support diaphragms 81, the partitions 90 to 94 as well as the end walls 40, 41 in the housing 19 can take place in any form known from the prior art, such as, by sticking, sealing, retaining strips, retaining studs, slots, sealing sections, grooves etc.

In FIGS. 13 to 16 a further embodiment of the cooling and calibrating device 5 is shown. As the basic construction corresponds essentially to the embodiments already described previously, in the description the same parts are provided as far as possible with the same reference symbols.

The housing 19 through which the object 7, i.e. the window section 8 is guided consists of the covering plate 35, the base plate 43, the end walls 40, 41 as well as the side walls 31, 32 which thus enclose the interior 83.

The interior 83 of the housing 19 is again sub-divided in its longitudinal extension in the extrusion direction arrow 4—by the support diaphragms 34, 36 to 39 into the regions 13 to 18. In this embodiment the support diaphragms 34, 36 to 39 are arranged in the extrusion direction—arrow 4—at different distances 112, 113, 114, 115, 116, 117 from each other and from the end walls 40, 41. Seen in the extrusion direction—arrow 4—the distances 112 to 117 increase continually from the end wall 41 in the direction of the end wall 40. As a result the object 7 from the extrusion die 3 running through the intake calliper 11 and entering into the cooling and calibrating device 5 in its initially still doughy state is better guided over a shorter distance through the apertures 65 arranged in the support diaphragms 34, 36 to 39 which form the section contour. On passing through the cooling and calibrating device 5, the object 7 is cooled down and become firmer, and the distance 112 to 117 of regions 13 to 18 are continually enlarged. Such an arrangement of the support diaphragms 34, 36 to 39 is of course also possible with the embodiments described previously.

Figure 16:
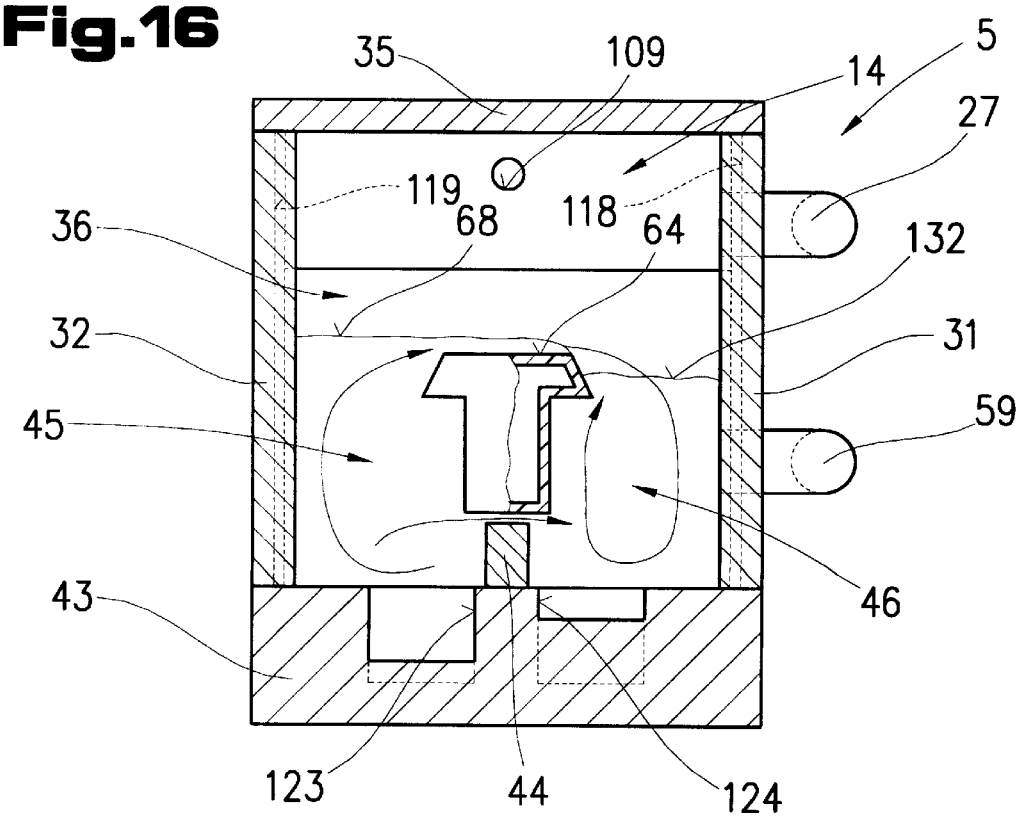
FIG. 16—the cooling and calibrating device according to FIGS. 13 to 15 in front elevation cut according to the lines XVI—XVI in FIG. 13.

With this embodiment the individual support diaphragms 34, 36 to 39 are inserted into recesses 118, 119 in the side walls 31, 32 (FIG. 16). These recesses 118, 119 are arranged in a plane oriented vertically to the base plate 43 and at right angles to the extrusion direction—arrow 4. Thus it is possible in a simple fashion to change the cooling and calibrating device 5 over quickly to different sectional shapes of the object 7, as the section contours 33 arranged in the support diaphragms 34, 36 to 39 can be simply interchanged. Sealing of the individual regions 13 to 18 relative to each other can be achieved, eg by sealing strips, jointing compound or sealing elements which are arranged on the peripheral edges of the support diaphragms 34, 36 to 39. As a result a sealed closure is achieved between the support diaphragms 34, 36 to 39 and the base plate 43, the covering plate 35 and the side walls 31, 32.

In the extrusion direction—arrow 4, each of the regions 13 to 18 is sub-divided by the longitudinal web 44 arranged between the underside 42 of the object 7 and the base plate 43 into the chambers 45 and the flush chambers 46 on respective sides of the object 7. The elevation 47 of the longitudinal web 44 is again slightly smaller than the distance 48 between the underside 42 of the window section 8 and the base plate 43 of the housing 19. The resultant gap between an upper side 120 of the longitudinal web 44 and the underside 42 of the object 7 has a thickness between 0.5 mm and 5 mm, preferably 2 mm, as a result of which a certain flow connection between the chamber 45 and the flush chamber 46 is formed. This is sufficient also to cool the underside 42 of the object 7 facing the longitudinal web 44 as is indicated schematically by an arrow 122.

A further advantage of this arrangement consists in that with the same elevation 47 of the longitudinal web 44, the lowest surface of the section contour 33 moulded in the support diaphragms, that is that which is nearest to the base plate 43, is always at about the same distance from the base plate 43. By varying the thickness 121 of the gap, the cooling effect desired there can be simply controlled. Thus the height of the section contour 33 can be adjusted exactly with respect to the surface of the base plate 43. The side walls 31, 32, the base plate 43, the covering plate 35 and the longitudinal web 44 remain unchanged and only the support diaphragms 34, 36 to 39 have to be interchanged. Obviously, however, it is also possible to mount both end walls 40, 41 likewise in recesses 118, 119. The fixing of the support diaphragms 34, 36 to 39 or of the end walls 40, 41 in terms of height occurs on the one hand by the base plate 43 and on the other hand by the covering plate 35. In order to be able to correct for possible manufacturing inaccuracies of the section contour with respect to the direction running transverse to the extrusion direction—arrow 4, the recesses 118, 119 are worked deeper into the two side walls 31, 32 than the width of the support diaphragms would require. By means of the resulting play on both sides, a certain self-centring of the support diaphragms 34, 36 to 39 and of the end walls 40, 41 with respect to the object 7 is possible.

Figure 13:
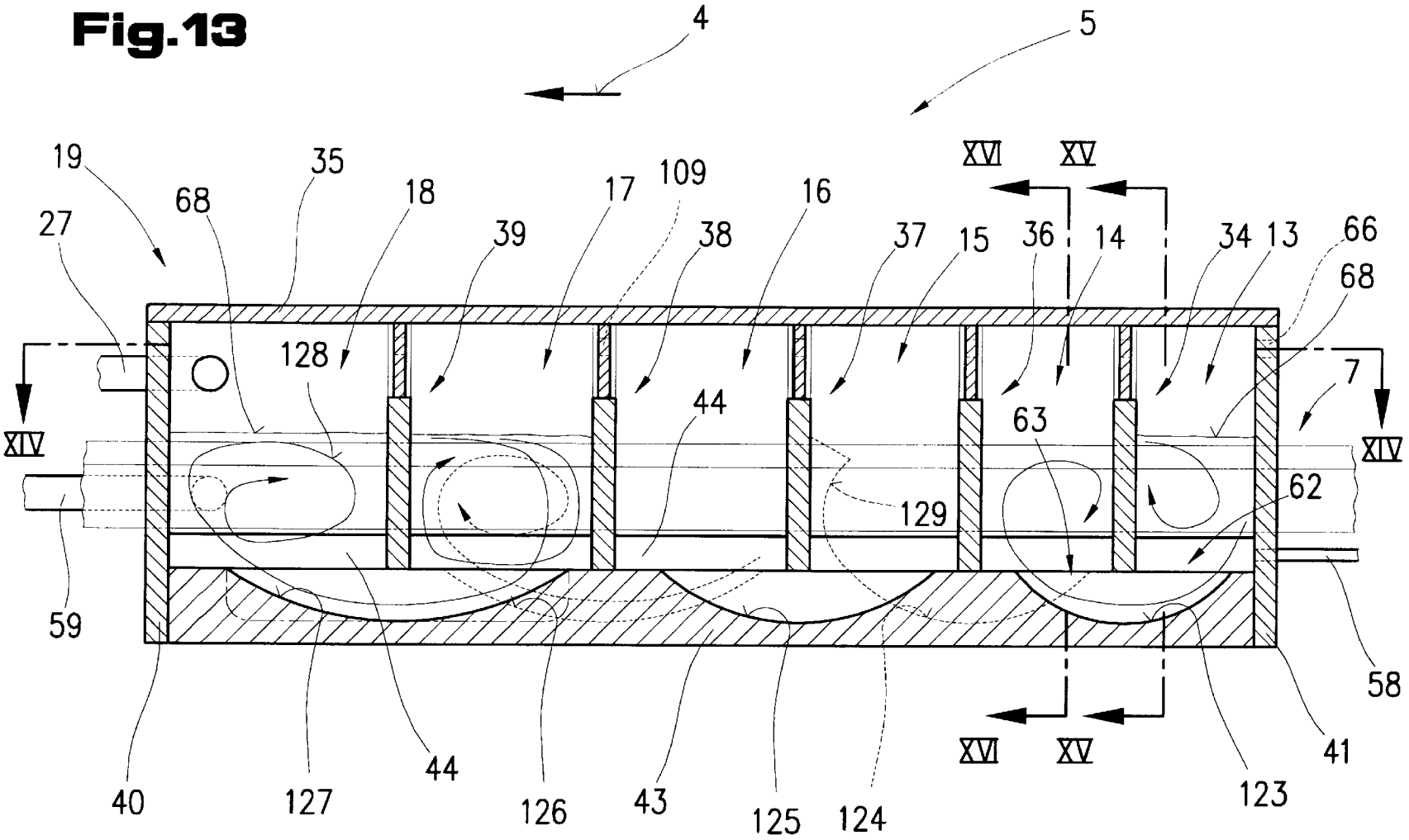
FIG. 13—a further embodiment of the cooling and calibrating device in side elevation cut according to the lines XIII—XIII in FIG. 14 and simplified schematic representation.
Figure 14:
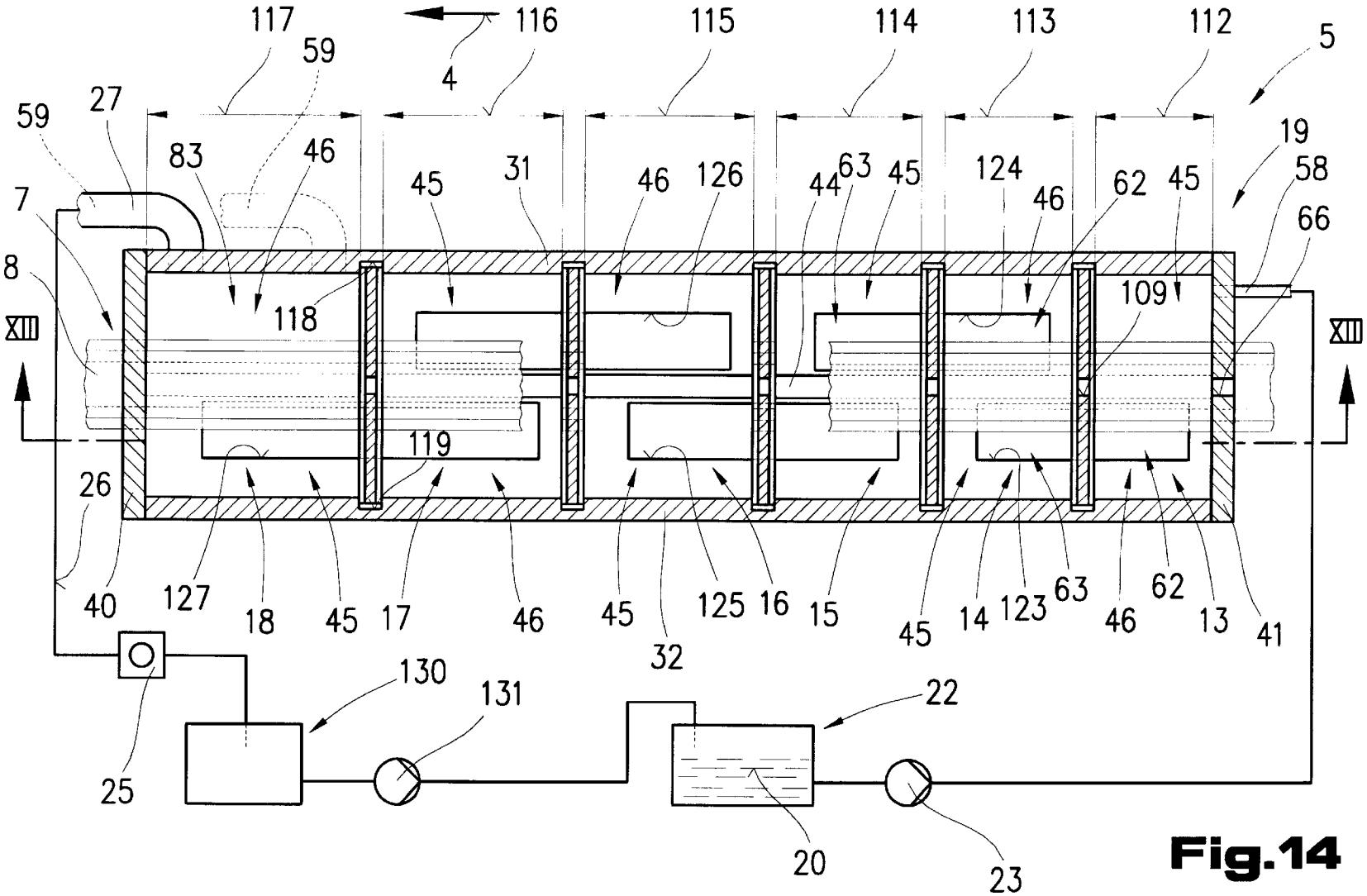
FIG. 14—the cooling and calibrating device according to FIG. 13 in plan view taken according to the lines XIV—XIV in FIG. 13.

The coolant water 20 is stored in the tank 22 and is fed by the coolant pump 23 via the connecting pipe 58 to the region 13 and there rises in the chamber 45 over the upper side 64 of the object 7 until the schematically indicated coolant level 68 is reached. By means of the coolant water 20 subsequently conveyed by the coolant pump 23, this overflows from the chamber 45 into the flush chamber 46 as is indicated schematically by the arrow 69. The individual regions 13 to 18 again have a flow connection among themselves through flow channels 123, 124, 125, 126, 127 arranged alternately on respective sides of the longitudinal web 44 which connect the inlet and outlet ports 62, 63 to each other and are arranged in the base plate 43. The flow channels 123 to 127 have, as is best seen in FIG. 13, a curved, concavely constructed longitudinal shape so that on passage of the coolant water 20 this is set in a correspondingly circular motion from the flush chamber 46 into the chamber 45, as is schematically indicated by an arrow 128 in the region 18. By this means a turbulence at the surface of the object 7 to be cooled and hence a massive coolant exchange is guaranteed, as a result of which the cooling effect is improved.

Figure 15:
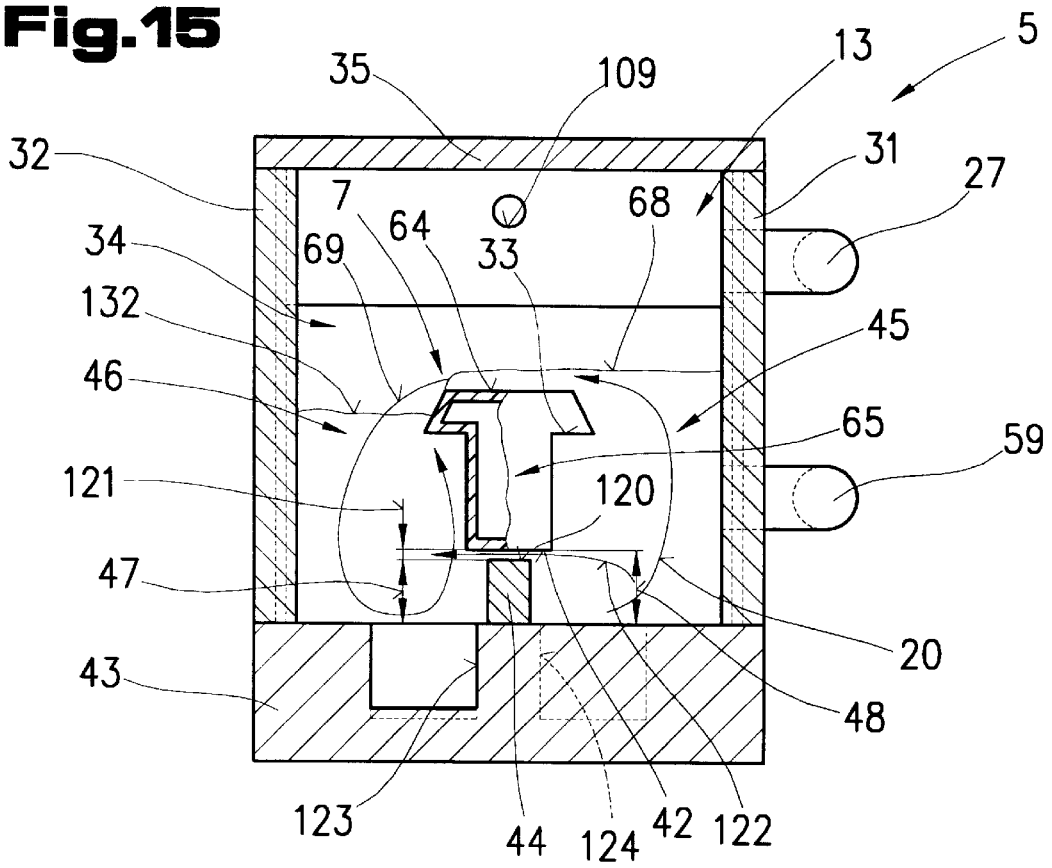
FIG. 15—the cooling and calibrating device according to FIGS. 13 and 14 in front elevation taken according to the lines XV—XV in FIG. 13.

Furthermore it is decisive that the individual flow channels 123 to 127 are arranged close to the longitudinal web 44, as is best seen in FIGS. 15 and 16, in order thus to ensure the frequent coolant exchange on the surface of the object already described previously. This coolant exchange is likewise increased or improved by the higher flow rate of the coolant when flowing through the flow channels 123 to 127 between the individual regions 13 to 18 with respect to the rate of advancement of the extruded object 7. This effect is further reinforced by the previously described circular motion—arrow 128, as this runs in the opposite direction to the extrusion direction—arrow 4—due to the construction of the flow channels 123 to 127.

A further possible embodiment of the flow channel is shown in FIG. 13 in dotted lines in the region of the flow channel 127. Viewed in the longitudinal direction this has an approximately rectangular cross section which in the transition from base to end wall is constructed with a rounded transition region.

In the region 15 of the cooling and calibrating device 5 a wing construction 129 following the flow channel 124 is shown which should intensify the agitation of the coolant or water 20 on passage from the flush chamber 46 into the chamber 45. The shape of this wing construction can be executed according to requirement and obviously be arranged in every chamber.

If the coolant water 20 were to be pumped through the housing 19 of the cooling and calibrating device 5 solely with the coolant pump 23, the cooling effect would be relatively slight as the object 7 would be drawn through only by a quantity of liquid coolant which is essentially static or moving forward at low speed.

In order to strengthen this flow movement and likewise to prevent any collapse of the moulded walls of the object 7, a vacuum is built up in the interior 83 of the housing 19 which increases continually from the region 13 in the direction of the region 18. In the region 13 the vacuum is still relatively slight, as here the object 7 entering into the cooling and calibrating device 5 still has no high stability of shape, and increases continually up to region 18 as here a cooling produced by the coolant or water 20 has already occurred and a hardening of the section is guaranteed.

In order to be able to build up a corresponding vacuum, the intake opening 66 is again arranged in the end wall 41. The individual regions 13 to 18 have a flow connection via the flow openings 109 arranged in the support diaphragms 34, 36 to 39 in the region of the covering plate 35. In the region 18 of the cooling and calibrating device 5, arranged in the side wall 31 is the discharge pipe 59 which opens out in a suction device, such as a cyclone 130. The cyclone 130 with the vacuum pump 25 preceding it in the discharge pipe 59 builds up the desired vacuum in the interior 83 on the one hand and also draws the coolant water 20 with it. In the cyclone 130 the coolant water 20 is separated from the air and returned again to the tank 22 by means of a coolant pump 131. Appropriate cooling devices for the coolant water 20 can again obviously be provided optionally in the individual pipes.

It is, however, equally possible, as indicated in FIG. 15, in addition to the connecting pipe 58 to arrange the connecting piece 27 in the side wall 31 in the region of the covering plate 35 in order thus to guarantee a separate suction of air and coolant water 20. Obviously also several connecting pipes 58 or alternatively connecting pieces 27 can be provided for suction. These do not have to be in one of the side walls 31, 32 but rather can also be arranged in the covering plate 35 or the base plate 43.

The alternating overflow of coolant water 20 from the chamber 45 into the flush chamber 46 and from there through the flow channel 123 into the chamber 45 of region 14 is best seen in FIGS. 15 and 16. In the region 14 the coolant water 20 rises in the chamber 45 until the coolant level 68 is reached and there overflows again over the upper side 64 of the object 7 into the flush chamber 46. There a further coolant level 132 is formed located at a height below the upper side 64, as is indicated by a narrow line.

Figure 17:
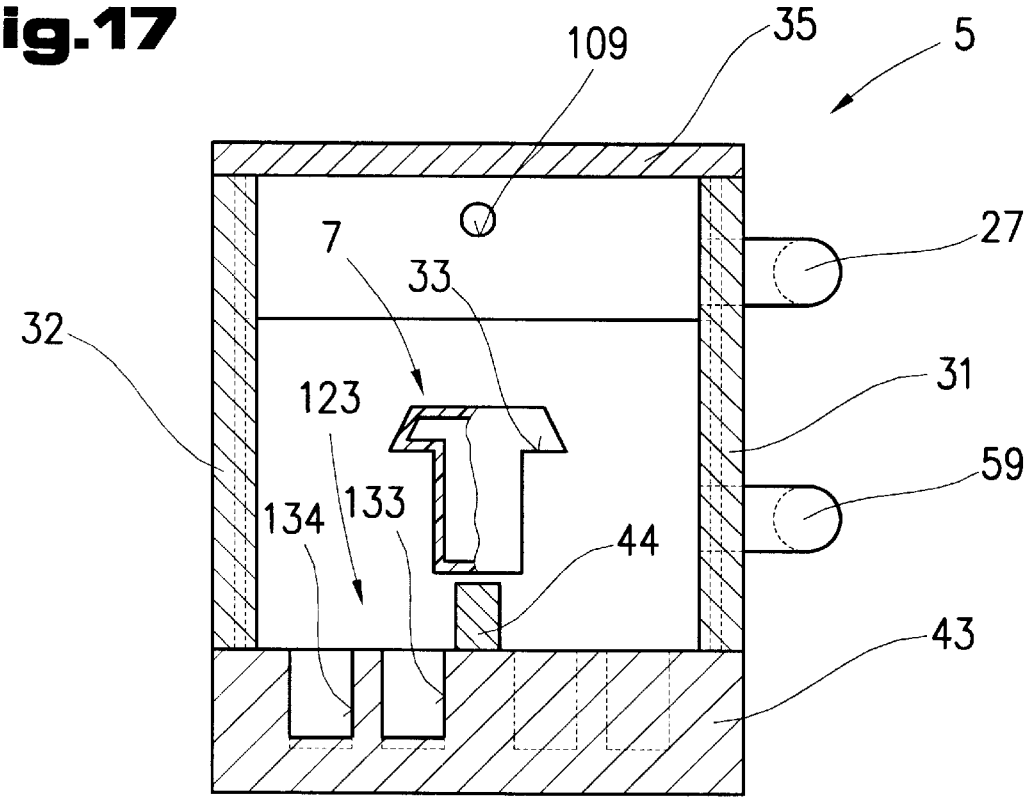
FIG. 17—another construction of the throughflow channels of the cooling and calibrating device according to FIGS. 13 to 16 in front elevation section.

In FIG. 17 a further possibility for carrying out the construction of the flow channels 123–127 is shown. In this the flow channel 123 illustrated in FIG. 17 viewed in the longitudinal direction of the cooling and calibrating device 5 consists of two single channels 133, 134 arranged beside each other. In order to achieve an appropriate turbulence or alignment of the coolant flow, the flow channels 123–127 or the single channels 133 and 134 can have any arbitrary cross sectional construction in their longitudinal or transverse extension to the extrusion direction—arrow 4.

Figure 18:
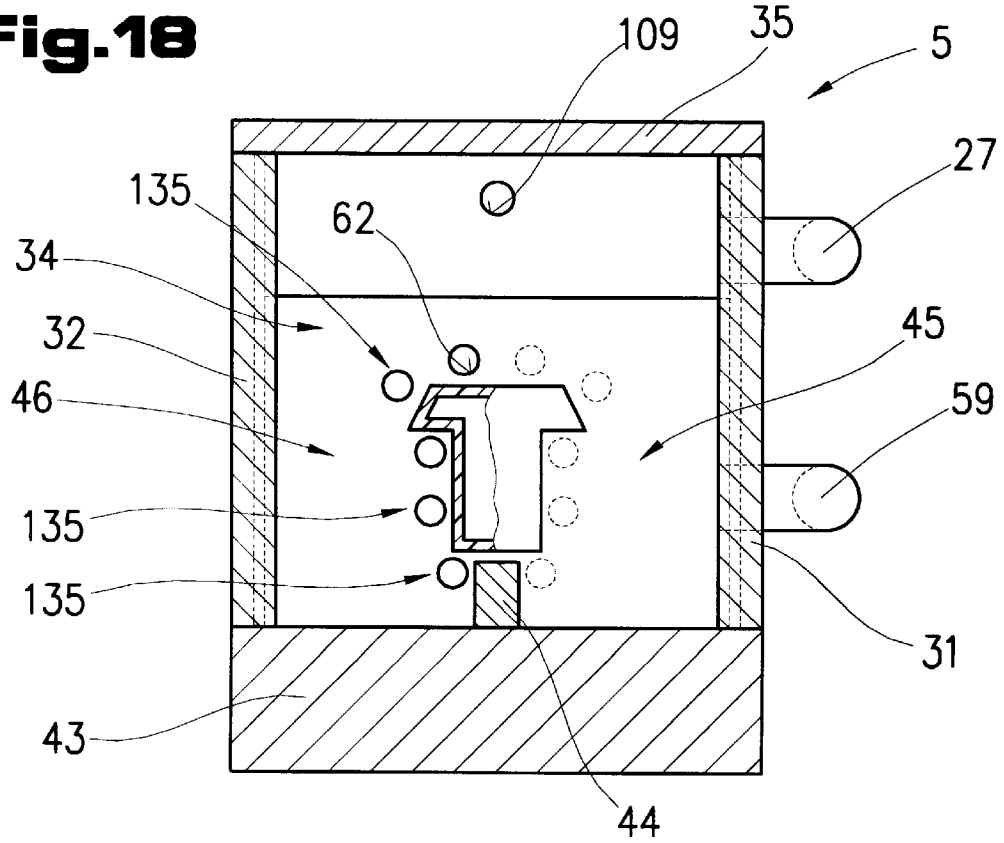
FIG. 18—a further embodiment of the inlet and outlet ports in a support diaphragm for connecting regions immediately adjacent to each other Cut in front elevation.

In FIG. 18 a further possible arrangement of inlet and outlet ports 62, 63 in the support diaphragms 34, 36 to 39 is illustrated. The individual inlet and outlet ports 62, 63 are arranged in the form of a plurality of ports 135 near the surface of the object viewed in the longitudinal direction in the individual support diaphragms again alternating on both sides of the longitudinal web 44. As a result the overflow of the coolant water 20 from the chamber 45 into the flush chamber 46 of each individual region 13 to 18 is again guaranteed, by which in turn a good cooling action is achieved. Furthermore by the arrangement of the ports 135 close to the surface in the region of the object 7 a laminar flow is achieved. This in turn has the effect of good cooling along the object 7.

In FIGS. 19 to 22 a further embodiment of the cooling and calibrating device 5 is shown. As the basic construction corresponds essentially to the embodiments already described previously according to FIGS. 13 to 16, in the description the same parts are provided as far as possible with the same reference symbols.

The housing 19 through which the object 7, i.e. the window section 8 is guided consists of the covering plate 35, the base plate 43, the end walls 40, 41 and the side walls 31, 32 which thus enclose the interior 83.

The interior 83 of the housing 19 is again sub-divided in its longitudinal extension in the extrusion direction arrow 4 by the support diaphragms 34, 36 to 39 into the regions 13 to 18. The support diaphragms 34, 36 to 39 are arranged in this embodiment in the extrusion direction—arrow 4—so that they are separated at different distances 112, 113, 114, 115, 116, 117 from each other and from the end walls 40, 41. Viewed in the extrusion direction—arrow 4, the intervals 112 to 117 increase continually from the end wall 41 in the direction of the end wall 40. By this means the object 7 from the extrusion die 3 running through the intake calliper 11 and entering into the cooling and calibrating device 5 in its initially still doughy state is better guided over a shorter distance by the apertures 65 arranged in the support diaphragms 34, 36 to 39 which form the section contour 33. Obviously, however, it is also possible to choose the individual distances 112 to 117 arbitrarily in order on the one hand to achieve the desired cooling and on the other hand to achieve the necessary support of the object 7. Once the object 7 when passing through the cooling and calibrating device 5 has already cooled a little and is thus more firm, the intervals 112 to 117 of the regions 13 to 18 can be continually enlarged. Such an arrangement of the support diaphragms 34, 36 to 39 is obviously also possible with the embodiments described previously.

The individual support diaphragms 34, 36 to 39 are also in this embodiment inserted into recesses 118, 119 in the side walls 31, 32.

In the extrusion direction—arrow 4, each of the regions 13 to 18 is sub-divided by the longitudinal web 44 arranged between the underside 42 of the object 7 and the base plate 43 into the chamber 45 and the flush chamber 46 on respective sides of the object 7. The elevation 47 of the longitudinal web 44 is again slightly smaller than the distance 48 between the underside 42 of the window section 8 and the base plate 43 of the housing 19. The resultant gap between the upper side 120 of the of the longitudinal web 44 and the underside 42 of the object 7 has a thickness 121 between 0.5 mm and 5 mm, preferably 2 mm, as a result of which a certain flow connection between the chamber 45 and the flush chamber 46 is formed. This is sufficient also to cool the underside 42 of the object 7 facing the longitudinal web 44 as is indicated schematically by an arrow 122.

A further advantage of this arrangement consists in that with the same elevation 47 of the longitudinal web 44 the lowest surface of the section contour 33 moulded in the support diaphragms, that is that which is nearest to the base plate 43, always has about the same distance from the base plate 43. By varying the thickness 121 of the gap the cooling effect desired there can be simply controlled.

Thus the height of the section contour 33 can be adjusted exactly with respect to the surface of the base plate 43. The side walls 31, 32, the base plate 43, the covering plate 35 and the longitudinal web 44 remain unchanged and only the support diaphragms 34, 36 to 39 have to be interchanged. Obviously, however, it is also possible to mount both end walls 40, 41 likewise in recesses 118, 119. The fixing of the support diaphragms 34, 36 to 39 or of the end walls 40, 41 in terms of height occurs on the one hand by the base plate 43 and on the other hand by the covering plate 35. In order to be able to correct for possible manufacturing inaccuracies of the section contour with respect to the direction running transverse to the extrusion direction—arrow 4, the recesses 118, 119 are worked deeper into the two side walls 31, 32 than the width of the support diaphragms would require. By means of the resulting play on both sides, a certain self-centring of the support diaphragms 34, 36 to 39 and of the end walls 40, 41 with respect to the object 7 is possible.

The coolant water 20 is stored in the tank 22 and is fed by the coolant pump 23 via the connecting pipe 58 to the region 13 and there rises in the chamber 45 over the upper side 64 of the object 7 until the schematically indicated coolant level 68 is reached. By means of the coolant water 20 subsequently conveyed by the coolant pump 23, this overflows from the chamber 45 into the flush chamber 46 as is indicated schematically by the arrow 69.

Figure 19:
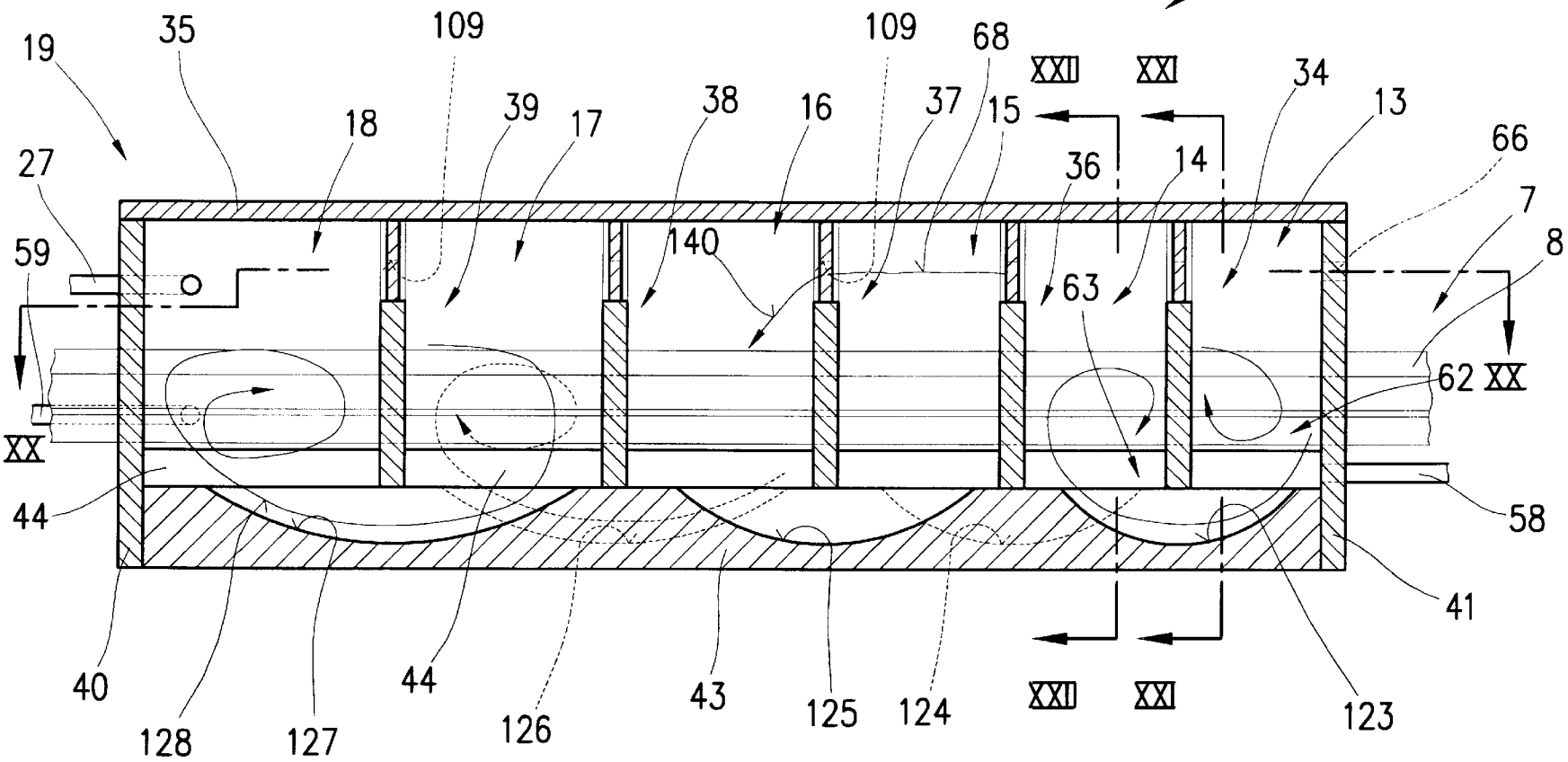
FIG. 19—a further embodiment of the cooling and calibrating device taken in side elevation according to the lines XIX—XIX in FIG. 20 and simplified schematic representation.
Figure 20:
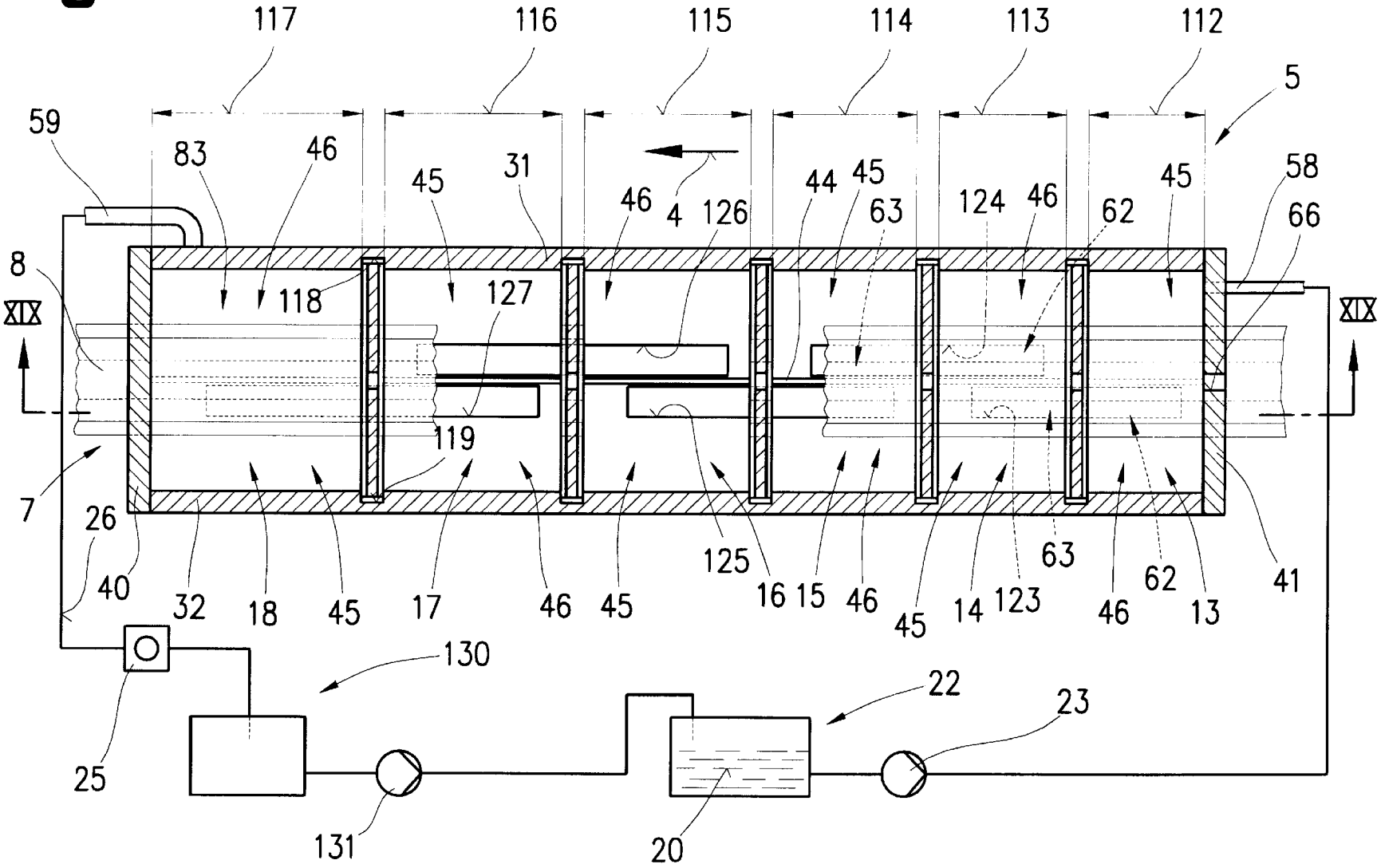
FIG. 20—the cooling and calibrating device according to FIG. 13 in plan view taken according to the lines XX—XX in FIG. 19.

The individual regions 13 to 18 again have a flow connection among themselves through flow channels 123, 124, 125, 126, 127 arranged alternately on both sides of the longitudinal web 44 which connect the inlet and outlet ports 62, 63 to each other and are arranged in a sunken manner in the base plate 43. The flow channels 123 to 127 have, as is best seen in FIG. 19, a curved, concavely constructed longitudinal shape so that on passage of the coolant or water 20 this is set in a correspondingly circular motion from the flush chamber 46 into the chamber 45, as is schematically indicated by the arrow 128 in the region 18. By this means a turbulence at the surface of the object 7 to be cooled and hence a massive coolant exchange, above all a good heat transfer, is guaranteed, as a result of which the cooling effect is improved.

Furthermore the cooling effect is additionally improved in that the individual flow channels 123 to 127 are arranged more closely on the longitudinal web 44, as is best seen from FIGS. 21 and 22, in order thus to additionally increase the frequent coolant exchange on the surface of the object 7 already described previously. Thus the side wall of the flow channels 123 to 127 facing the longitudinal web 44 can be in alignment with the side wall of the longitudinal web 44 or be arranged at a smaller distance of, to take an example, 1 mm to 20 mm.

This coolant exchange is likewise increased or improved by the higher flow rate of the coolant when flowing through the flow channels 123 to 127 between the individual regions 13 to 18 relative to the rate of advancement of the extruded object 7. This effect is furthermore reinforced by the previously described circular motion of the coolant—arrow 128, as this runs in the opposite direction to the extrusion direction—arrow 4, subject to the construction of the flow channels 123 to 127.

Furthermore it is also possible to execute the flow channels according to the manner described in FIG. 13 and illustrated in dotted lines.

In order to strengthen this flow movement of the coolant water 20 and likewise to prevent any collapse of the moulded walls of the object 7, a vacuum is built up in the interior 83 of the housing 19 which increases continually from the region 13 in the direction of the region 18. In the region 13 the vacuum is still relatively slight, as here the object 7 entering into the cooling and calibrating device 5 still has no high stability of shape, and increases continually up to region 18 as here a cooling dependent on the coolant or water 20 has already occurred and a hardening of the section is guaranteed.

In order to build up an appropriate vacuum, the intake opening 66 is again arranged in the end wall 41. The individual regions 13 to 18 have a flow connection via the flow openings 109 arranged in the support diaphragms 34, 36 to 39.

With this embodiment the flow openings 109 viewed in the extrusion direction—arrow 4—have an approximately rectangular cross section with a width 136 and a height 137 and are constructed as longitudinal slots. The flow openings 109 are arranged in each case in the upper region of the individual support diaphragms 34 or 36 to 39 and approximately centrally between the side walls 31 and 32 and between the aperture 65 and the covering plate 35. Obviously, however, it is also possible to arrange the flow openings 109 laterally with respect to the aperture 65 and in a direction parallel to the base plate 43, but displaced or alternating with each other vertically to the extrusion direction, as is indicated in FIG. 21 by dotted lines. With this an upper edge 138 of the individual flow openings 109 is arranged separated from the covering plate by a distance 139. Thus by the size of the individual flow openings 109 on the one hand the vacuum to be built up in the individual regions 13 to 18 can be regulated and on the other hand a self- regulating effect of the coolant level 68 can be achieved by the choice of the distance 139, as is schematically illustrated in detail in FIG. 19 on the basis of regions 15 and 16.

In normal operation the flow openings 109 serve to build up the vacuum in the individual regions 13 to 18 and have air flowing through them. If an accumulation of coolant water 20 now occurs, as is schematically indicated in region 15, the coolant level 68 rises up into the region of the flow opening 109 and partially seals this, as a result of which there is a reduction in the cross section of the latter. Subject to the reduction in cross section, the vacuum to be built up in the following regions 16 to 18 rises still higher, as a result of which there is a reinforced suction on the coolant water 20 in the flow channels 125 to 127 and in this fashion the coolant level 68 sinks again to its normal state. As a result of this sinking the full cross section of the flow opening 109 is now available again to the air flowing through, as a result of which the desired vacuum or the build up of the vacuum in the individual regions 13 to 18 again assumes the preselected or desired operational state. Furthermore in the region of the flow opening 109 of the support diaphragm 37 is schematically indicated by an arrow 140 that subject to the higher coolant level 68 in the region 15 also the coolant water 20 also overflows through the flow opening 109 into the following region 16. In addition this overflow is further favoured by the rising vacuum in the following regions 17 and 18.

In the region 18 of the cooling and calibrating device 5, arranged in the side wall 31 is the discharge pipe 59 which opens out into a suction device, such as the cyclone 130. The cyclone 130 with the vacuum pump 25 preceding it in the discharge pipe 59 builds up on the one hand the desired vacuum in the interior 83 and also sucks off the coolant or water 20. In the cyclone 130 the coolant or water 20 is separated from the air and fed back again by means of the coolant pump 131 to the tank 22. Obviously again appropriate cooling devices for the coolant water 20 can be optionally provided in the individual pipes.

Obviously also several connecting pipes 58 and connecting pieces 27 can be provided for suction. These do not have to be in one of the side walls 31, 32 but rather can also be arranged in the covering plate 35 or the base plate 43.

The alternating overflow of coolant or water 20 from the chamber 45 into the flush chamber 46 and from there through the flow channel 123 into the chamber 45 of region 14 is best seen in FIGS. 21 and 22. Due to the constantly growing vacuum in the consecutive regions 13 to 18 and the special construction of the flow channels 123 to 127, the coolant water 20 surges or flows like a spring, as is schematically indicated by arrows 69 in FIG. 22, in the direction of the covering plate 35 and so runs over from the chamber 45 via the upper side 64 into the flush chamber 46 on the other side of the object 7. There it forms a further coolant level 132 with height located below the upper side 64 and the coolant enters into the respective inlet port 62 of the individual flow channels 123 to 127 and this process of the coolant rising like a spring repeats itself accordingly in the following regions 14 to 18.

The mounting or fastening of the individual support diaphragms 34, 36 to 39 as well as the end walls 40, 41 in the housing 19 can take place in any form known from the prior art, such as by sticking, sealing, retaining strips, retaining studs, slots, sealing sections, grooves etc.

In order better to illustrate the difference in level between the higher lying coolant level 68, 69 and the lower lying coolant level 132 also in figures already described previously, the coolant level 132 is also indicated schematically by thin lines in FIGS. 2, 3, 5, 8, 9, as well as 11 and 12.

In practice it has in fact been shown that after starting the manufacturing process for the object 7, on stabilising the individual operating parameters, both the vacuum as well as the other conditions in the cooling and calibrating device 5 scarcely change again so that a value once set is then retained without trouble even over quite long operating periods.

The advantage of this swirling and rinsing of the object 7 with the coolant and the frequent and intensive contact of a constantly changing part of the coolant with the surface of the object 7 results in a better heat transfer taking place between the object 7 and the coolant so that with a smaller quantity of coolant, the same amount of heat can be extracted from the object 7 than for example when using spray nozzles with which the coolant is sprayed on to the window section 8, i.e. the object 7 passing through the cooling and calibrating device 5. A disadvantage of the spray nozzles used hitherto can therefore be avoided. This lies above all in the fact that impurities or lime entrained in the coolant easily obstruct or block them as a result of which it is necessary to clean them frequently or to replace them altogether in order to achieve a corresponding cooling effect. This entails in any case a dismantling of the cooling and calibrating device 5 and increased costs because of the production stoppage.

As a result of the longitudinal flow which results from the individual flow channels 123 to 127 in combination with the constantly rising partial vacuum in the individual regions 13 to 18, all longitudinal sections or longitudinal grooves of the sections, such as for example mountings for glass strips or clutch sections or similar things, are in advantageous manner flushed at equally high speed compared to the speed of advancement of the section in the housing 9. As a result a considerable improvement of the cooling action is achieved, compared for example to the usual spray cooling processes, as during spraying the liquid only gathers in such depressions or grooves and no exchange of liquid occurs on the surface of the plastic section except in the region of the individual diaphragms.

It is further to be taken into account that especially when the longitudinal web 44 has a small thickness 141 transverse to the longitudinal direction of the section or a small cross sectional area, especially relative to the section to be cooled, and when the flow channels 123 to 127 are arranged immediately adjacent to the longitudinal web 44, a constant exchange of liquid occurs over a still larger surface of the section to be cooled through the agitation of the coolant on the surface of the section and as a result a higher specific cooling action can be achieved.

It has proved to be preferable when as an example the thickness 141 of the longitudinal web 44 is less than 10 mm, preferably equal to or less than 5 mm.

In connection with the different partial vacuums in the individual regions 13 to 18 there results in combination with the flow channels 123 to 128 a transport of coolant like a surge or turbo jet in the region of the section to be cooled, as a result of which the advantages already mentioned previously are reinforced.

As a result a lower propulsive output is required for the coolant pumps 23 in question on account of the reduced quantity of coolant to be conveyed and the total energy balance sheet when manufacturing such objects 7 is better in an advantageous manner than with the conventional cooling and calibrating devices 5.

The supply and removal of coolant is indicated only schematically. Thus it is obviously possible to use any known device from the prior art as well as either a closed or open coolant circulation.

In conclusion it is pointed out that for better understanding individual parts of the cooling and calibrating device 5 are illustrated in a highly simplified and schematic manner and, with regard to dimensions, in a disproportionate or distorted manner.

Also individual details of the individual embodiments as well as combinations of individual details can form independent solutions according to the invention.

Especially the individual executions shown in FIGS. 1 to 5; 6; 7; 8 to 12; 13 to 16; 17; 18; 19 to 22 form the subject matter of independent solutions according to the invention. The relevant tasks and solutions according to the invention can be gathered from the detailed descriptions of these figures.

LIST OF REFERENCE SYMBOLS

1. Extrusion plant
2. Extruder
3. Extrusion die
4. Arrow
5. Cooling and calibrating device
6. Caterpillar take-off
7. Object
8. Window section
9. Plastic
10. Worm conveyor
11. Intake calliper
12. Cooling chamber
13. Region
14. Region
15. Region
16. Region
17. Region
18. Region
19. Housing
20. Water
21. Setting-up surface
22. Tank
23. Coolant pump
24. Return tube
25. Vacuum pump
26. Exhaust pipe
27. Connecting piece
28. Connecting tube
29. Manometer
30. Throttle valve
31. Side wall
32. Side wall
33. Section contour
34. Support diaphragm
35. Covering plate
36. Support diaphragm
37. Support diaphragm
38. Support diaphragm
39. Support diaphragm
40. End wall
41. End wall
42. Underside
43. Base plate
44. Longitudinal web
45. Chamber
46. Flush chamber
47. Height/Elevation
48. Distance
49. Transverse web
50. Outer wall
51. Channel
52. Channel
53. Channel
54. Channel
55. Channel
56. Connecting channel
57. Connecting channel
58. Connecting pipe
59. Discharge pipe
60. Width
61. Arrow
62. Inlet port
63. Outlet port
64. Upper side
65. Aperture
66. Intake opening
67. Suction opening
68. Coolant level
69. Arrow
70. Side wall
71. Diameter
72. Internal thread
73. Plug
74. Slot
75. Slot
76. Difference in height
77. Exit height
78. Size
79. Fastening means
80. Distance/Interval
81. Support diaphragm
82. Intermediate cooler
83. Interior
84. Suction pipe
85. Longitudinal web
86. Region
87. Region
88. Region
89. Region
90. Partition
91. Partition
92. Partition
93. Partition
94. Partition
95. Region
96. Region
97. Region
98. Height
99. Coolant level
100. End edge
101. Chamber

102. Flush chamber
103. Coolant head
104. Chamber
105. Arrow
106. Arrow
107. Flush chamber
108. Chamber
109. Flow opening
110. Arrow
111. Connecting tube
112. Distance
113. Distance
114. Distance
115. Distance
116. Distance
117. Distance
118. Recess
119. Recess
120. Upper side
121. Thickness
122. Arrow
123. Flow channel
124. Flow channel
125. Flow channel
126. Flow channel
127. Flow channel
128. Arrow
129. Wing construction
130. Cyclone
131. Coolant pump
132. Coolant level
133. Single channel
134. Single channel
135. Port
136. Width
137. Height
138. Upper edge
139. Distance
140. Arrow
141. Thickness

I claim:

1. A process for cooling an elongated extruded plastic object while advancing the object in a longitudinal direction through an interior of a closed housing, which comprises the steps of (a) dividing the housing interior by support diaphragms into a plurality of consecutive regions including an inlet region at one end of the housing and an outlet region at an opposite end of the housing, (b) passing the object into the inlet region and through calibrating apertures in the support diaphragms into the consecutive regions, and discharging the object from the outlet region, (c) dividing the consecutive regions by a web extending in the longitudinal direction into chambers arranged at respective lateral sides of the object, (1) the web extending a minimal distance from an end face of the object, (d) circulating a cooling liquid though the consecutive regions by delivering the liquid to the inlet region through an inlet port in the housing and removing the liquid from the outlet region through an outlet port in the housing, (1) each chamber at one side of the object being in communication with the chamber at the other side of the object in the consecutive region whereby the circulating cooling liquid flows from the chambers on the one side over the object into the chambers at the other side, and (e) exposing the advancing object to a gradually increasing vacuum in the consecutive regions.

2. The process of claim 1, comprising the step of separating the consecutive regions in a fluid-tight and gas-tight manner.

3. The process of claim 2, wherein a gradually increasing vacuum is applied independently to each one of the consecutive regions.

4. The process of claim 2, wherein a vacuum pressure is applied to the inlet region and the vacuum is permitted to be gradually increased in the consecutive regions by providing flow openings between the regions.

5. The process of claim 1, wherein the cooling liquid is drawn from the chamber at one side of the object into the chamber at the other side of the object in the consecutive region by the higher vacuum in the consecutive region and is raised above the object as it flows one side to the other side.

6. The process of claim 1, comprising the step of jointly exhausting the vacuum and removing the cooling liquid from the outlet region.

7. An apparatus for cooling an elongated extruded plastic object while advancing the object in a longitudinal direction, which comprises (a) a closed housing comprising a cover plate, a bottom plate, two end walls and two side walls, the cover plate, bottom plate and walls defining (1) an interior wherethrough the object is advanced in the longitudinal direction from an inlet region at one end wall of the housing to an outlet region at an opposite end wall, (b) consecutive support diaphragms dividing the interior into consecutive regions, the support diaphragms having calibrating apertures through which the object passes and is advanced, (c) a web extending in the longitudinal direction and dividing the consecutive regions into chambers arranged at respective lateral sides of the object, (1) the web extending a minimal distance from an end face of the object, (d) an inlet port in the housing for delivering a circulating cooling liquid to the inlet region and an outlet port in the housing for removing the liquid from the outlet region, (1) each chamber at one side of the object being in communication with the chamber at the other side of the object in the consecutive region whereby the circulating cooling liquid flows from the chambers on the one side over the object into the chambers at the other side, and (e) means for applying a gradually increasing vacuum to the consecutive regions.

8. The cooling apparatus of claim 7, wherein the means for applying a gradually increasing vacuum comprises an exhaust port in the outlet region of the housing, a vacuum pump having an intake connected to the exhaust port, and an intake port in the inlet region of the housing, the intake port being connected to an output of the vacuum pump.

9. The cooling apparatus of claim 7, wherein the web extends from the cover plate towards the end face of the object.

10. The cooling apparatus of claim 9, further comprising partitions mounted on the consecutive support diaphragms, the partitions being alternately arranged between the cover plate, the web and one of the side walls and the other one of the side walls whereby the chambers in the consecutive regions at each side are closed off from each other.

11. The cooling apparatus of claim 7, wherein the web extends from the bottom plate towards the end face of the object.

12. The cooling apparatus of claim 11, further comprising channels below the bottom plate connecting the inlet and outlet ports for the cooling liquid.

13. The cooling apparatus of claim 7, wherein the inlet and outlet ports are arranged in the support diaphragms.

14. The cooling apparatus of claim 7, further comprising a tank holding the cooling liquid, a pump having an intake connected to the tank and an output, a pipe connecting the pump output to the inlet port in the housing for delivering the cooling liquid to the inlet region, and a pipe connecting the outlet port in the housing to the tank for removing the liquid from the outlet region into the tank.

15. The cooling apparatus of claim 14, further comprising a vacuum pump, a cyclone following the vacuum pump and another pump for the cooling liquid arranged in the connecting pipe between the outlet port and the tank.

16. The cooling apparatus of claim 7, wherein the one end wall has an intake opening receiving ambient air.

17. The cooling apparatus of claim 16, wherein the support diaphragms have flow openings permitting the air to pass therethrough.

18. The cooling apparatus of claim 7, wherein the means for applying the gradually increasing vacuum comprises a vacuum pump and a separate pipe connecting each region to the vacuum pump.

19. The cooling apparatus of claim 7, wherein the gradually increasing vacuum causes the level of the cooling liquid in each chamber at one side of the object to be higher than in the chamber at the other side of the object in the consecutive region.

20. The cooling apparatus of claim 7, wherein the vacuum gradually increases by at least 0.002 bar.

21. The cooling apparatus of claim 20, wherein the vacuum gradually increases by at least 0.005 bar.

22. The cooling apparatus of claim 7, wherein said minimal distance of the web from the end face of the object is between 0.5 mm and 5 mm.

23. The cooling apparatus of claim 7, wherein the support diaphragms are spaced from each other in the longitudinal direction from the inlet to the outlet region at increasing distances.

24. The cooling apparatus of claim 7, wherein the side walls of the housing have recesses displaceably receiving and holding the support diaphragms.

25. The cooling apparatus of claim 24, wherein the recesses have end faces defining a distance extending perpendicularly to the longitudinal direction and exceeding the width of the support diaphragms.

26. The cooling apparatus of claim 7, wherein the support diaphragms have ports close to the calibrating apertures.

27. The cooling apparatus of claim 7, wherein the bottom plate defines flow channels recessed into the bottom plate and facing the interior of the housing, the flow channels being in communication with the chambers in the consecutive regions.

28. The cooling apparatus of claim 27, wherein the flow channels extend parallel to the longitudinal direction.

29. The cooling apparatus of claim 27, wherein the flow channels span the consecutive regions and extend from one of the regions to at least the center of the consecutive region in the longitudinal direction.

30. The cooling apparatus of claim 27, wherein the flow channels have a rectangular cross section in plan view.

31. The cooling apparatus of claim 27, wherein the flow channels have a rectangular cross section in a plan extending perpendicularly to the longitudinal direction.

32. The cooling apparatus of claim 27, wherein the flow channels have a concave cross section in a plan extending perpendicularly to the longitudinal direction.

33. The cooling apparatus of claim 27, wherein the flow channels are offset from each other in a direction extending perpendicularly to the longitudinal direction.

34. The cooling apparatus of claim 27, wherein the flow channels overlap consecutive ones of the regions.

35. The cooling apparatus of claim 27, comprising a plurality of said flow channels between consecutive ones of the regions.

36. The cooling apparatus of claim 27, wherein respective ones of the flow channels are alternately arranged in the longitudinal direction between the web and a respective one of the side walls.

37. The cooling apparatus of claim 27, wherein the flow channels have side walls facing side walls of the web facing the side walls of the housing, the side walls of the channels being flush with the side walls of the web.

38. The cooling apparatus of claim 27, wherein the flow channels have side walls facing side walls of the web facing the side walls of the housing, the side walls of the channels being spaced from the side walls of the web by less than 10 mm.

39. The cooling apparatus of claim 7, wherein the support diaphragms have rectangular openings having a length extending perpendicularly to the bottom plate which exceeds a width thereof extending parallel to the bottom plate and transversely to the longitudinal direction.

40. The cooling apparatus of claim 7, wherein the support diaphragms have openings arranged between the calibrating apertures and the cover plate, the openings having lower edges spaced from upper edges of the calibrating apertures.

41. The cooling apparatus of claim 7, wherein the support diaphragms have openings offset from the calibrating apertures in a direction extending perpendicularly to the longitudinal direction.

42. The cooling apparatus of claim 7, wherein the web has a thickness of less than 10 mm, extending perpendicularly to the longitudinal direction.

43. The cooling apparatus of claim 42, wherein the thickness is less than 5 mm.

*44. A process for cooing an elongated extruded plastic object while advancing the object in a longitudinal direction through an interior of a closed housing, which comprises the steps of*

(*a*) *dividing the housing interior by support diaphragms into a plurality of consecutive regions including an inlet region at one end of the housing and an outlet region at an opposite end of the housing,*

(*b*) *passing the object into the inlet region and through calibrating apertures in the support diaphragms into the consecutive regions, and discharging the object from the outlet region,*

(*c*) *delivering a cooling liquid to the inlet region through an inlet port in the housing and removing the liquid from the outlet region through an outlet port in the housing,*

(*1*) *the cooling liquid in the housing interior forms a cooling liquid level,*

(*d*) *supplying air into the inlet region through an intake opening* (*66*) *and guiding the air through the consecu-*

*tive regions through air flow openings (109) and suctioning the air in the outlet region through an outlet,*

*(1) build up of a vacuum increasing between 0.002 and 0.1 bar in the respectively consecutive regions by the air being fed therethrough,*

*(e) guiding the air and the cooling liquid separately from one another between the respectively consecutive regions with different vacuums,*

*(f) moving the cooling liquid from the inlet region through the consecutive regions to the outlet region by the increasing vacuum created in the interior.*

*45. An apparatus for cooling an elongated extruded plastic object while advancing the object in a longitudinal direction, which comprises*

*(a) a closed housing comprising a cover plate, a bottom plate, two end walls and two side walls, the cover plate, bottom plate and walls defining*

*(1) an interior where through the object is advanced in the longitudinal direction from an inlet region at one end wall of the housing to an outlet region at an opposite end wall,*

*(b) consecutive support diaphragms dividing the interior into consecutive regions the support diaphragms having calibrating apertures through which the object passes and is advanced,*

*(c) an inlet port in the housing for delivering a circulating cooling liquid to the inlet region and an outlet part in the housing for removing the liquid from the outlet region, and in the housing interior a cooling liquid level is formed;*

*(d) the consecutive regions are connected together via inlet and outlet ports (62, 63) for the cooling liquid, which are arranged below the cooling liquid level,*

*(e) the consecutive regions are also connected together via additional flow openings (109), which are arranged above the cooling liquid level,*

*(1) said flow openings (109) for building up a pressure difference of between 0.002 and 0.1 bar are formed in flow direction between the directly consecutive regions,*

*(2) the pressure difference produced creates a vacuum increasing from the inlet region to the outlet region relative to external environmental pressure.*

*46. An apparatus for cooling an elongated extruded plastic object while advancing the object in a longitudinal direction which comprises*

*(a) a closed housing comprising a cover plate, a bottom plate, two end walls and two side walls, the cover plate, bottom plate and walls defining*

*(1) an interior where through the object is advanced in the longitudinal direction from an inlet region at one end wall of the housing to an outlet region at an opposite end wall,*

*(b) consecutive support diaphragms dividing the interior into consecutive regions the support diaphragms having calibrating apertures through which the object passes and is advanced,*

*(c) an inlet port in the housing for delivering a circulating cooling liquid to the inlet region and an outlet part in the housing for removing the liquid from the outlet region, and in the housing interior a cooling liquid level is formed;*

*(d) the consecutive regions are connected together via inlet and outlet ports (62, 63) for the cooling liquid, which are arranged below the cooling liquid level,*

*(1) the inlet and outlet opening (62, 63) of directly adjacent regions (13–16) is connected respectively by at least one flow channel (123–127) arranged in the bottom plate (43),*

*(e) the flow channel is recessed in the bottom plate (43) on the surface facing the interior and comprises a bottom face and side walls,*

*(f) the calibrating aperture (65) projects over at least one of the side walls of the flow channel in a direction perpendicular to extrusion direction.*

* * * * *

UNITED STATES PATENT AND TRADEMARK OFFICE

CERTIFICATE OF CORRECTION

PATENT NO. : Re. 36,585
DATED : February 29, 2000
INVENTOR(S) : Purstinger

It is certified that error appears in the above-identified patent and that said Letters Patent is hereby corrected as shown below:

Title page, [56] References Cited, OTHER PUBLICATIONS, insert the following:

--ING. H.O. SCHIEDRUM, Kalibrieren und Kühlen von Rohren, Plastverarbeiter 30, Jahrgang 1979 Nr. 6, Pages 321-328.--.

Title page, item [56], under Other Publications, insert the following:

ING. F. SASS AND ING. CH. BOUCHE, Dubbels Taschenbuch für den Maschinenbau, , Springer-Verlag, Berlin 1956, Pages 434-437

ING. WOLFGANG BEITZ AND ING. KARL-HEINZ KÜTTNER, Dubbel Taschenbuch für den Maschinenbau, Springer-Verlag, Berlin 1983, Pages 159-163 and 243-246

WALTER MICHAELI, Extrusions-Werkzeuge für Kunststoffe und Kautschuk, Munchen, Wien:Hanser, 1991, Pages 323-327, 345-346

DR. FRANZ PRÁŠIL, Technische Hydrodynamik, Verlag von Julius Springer, Berlin 1926, Pages 15 and 16

| | | | | |
|---|---|---|---|---|
| 5,499,507 | | Frank P. Dorninger | 03-19-1996 | |
| 5,505,058 | | Frank P. Dorninger | 04-09-1996 | |
| | | | | |

Signed and Sealed this

First Day of May, 2001

*Attest:*

Nicholas P. Godici

NICHOLAS P. GODICI

*Attesting Officer*

*Acting Director of the United States Patent and Trademark Office*